(12) United States Patent
Yoda et al.

(10) Patent No.: US 10,908,934 B2
(45) Date of Patent: Feb. 2, 2021

(54) SIMULATION PROGRAM, METHOD, AND DEVICE

(71) Applicant: FUJITSU LIMITED, Kawasaki (JP)

(72) Inventors: Katsuhiro Yoda, Kodaira (JP); Takahiro Notsu, Kawasaki (JP); Mitsuru Tomono, Higashimurayama (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 16/026,459

(22) Filed: Jul. 3, 2018

(65) Prior Publication Data
US 2019/0012191 A1 Jan. 10, 2019

(30) Foreign Application Priority Data
Jul. 6, 2017 (JP) ................. 2017-133099

(51) Int. Cl.
*G06F 9/46* (2006.01)
*G06F 9/455* (2018.01)
*G06F 9/30* (2018.01)
*G06F 9/50* (2006.01)

(52) U.S. Cl.
CPC .......... *G06F 9/455* (2013.01); *G06F 9/30192* (2013.01); *G06F 9/468* (2013.01); *G06F 9/5011* (2013.01); *G06F 9/5027* (2013.01)

(58) Field of Classification Search
CPC ...... G06F 9/455; G06F 9/30192; G06F 9/468; G06F 9/5011
See application file for complete search history.

(56) References Cited

U.S. PATENT DOCUMENTS

| | | | | |
|---|---|---|---|---|
| 6,173,392 B1* | 1/2001 | Shinozaki | ............... | G06F 9/383 711/213 |
| 2009/0112561 A1* | 4/2009 | Behm | ..................... | G06F 30/33 703/17 |
| 2010/0269103 A1* | 10/2010 | Wu | ......................... | G06F 30/33 717/146 |
| 2014/0325468 A1 | 10/2014 | Satoh et al. | | |

FOREIGN PATENT DOCUMENTS

| JP | 1-314345 | 12/1989 |
|---|---|---|
| JP | 2004-021907 | 1/2004 |
| JP | 2014-215768 | 11/2014 |

* cited by examiner

*Primary Examiner* — Camquy Truong
(74) *Attorney, Agent, or Firm* — Fujitsu Patent Center

(57) ABSTRACT

A simulation method performed by a computer for simulating operations by a plurality of cores based on resource access operation descriptions on the plurality of cores, the method includes steps of: extracting a resource access operation description on at least one core of the plurality of cores by executing simulation for the one core; and, under a condition where the one core and a second core among the plurality of cores have a specific relation in execution processing, generating a resource access operation description on the second core from the resource access operation description on the one core by reflecting an address difference between an address of a resource to which the one core accesses and an address of a resource to which the second core accesses.

10 Claims, 22 Drawing Sheets

FIG. 2
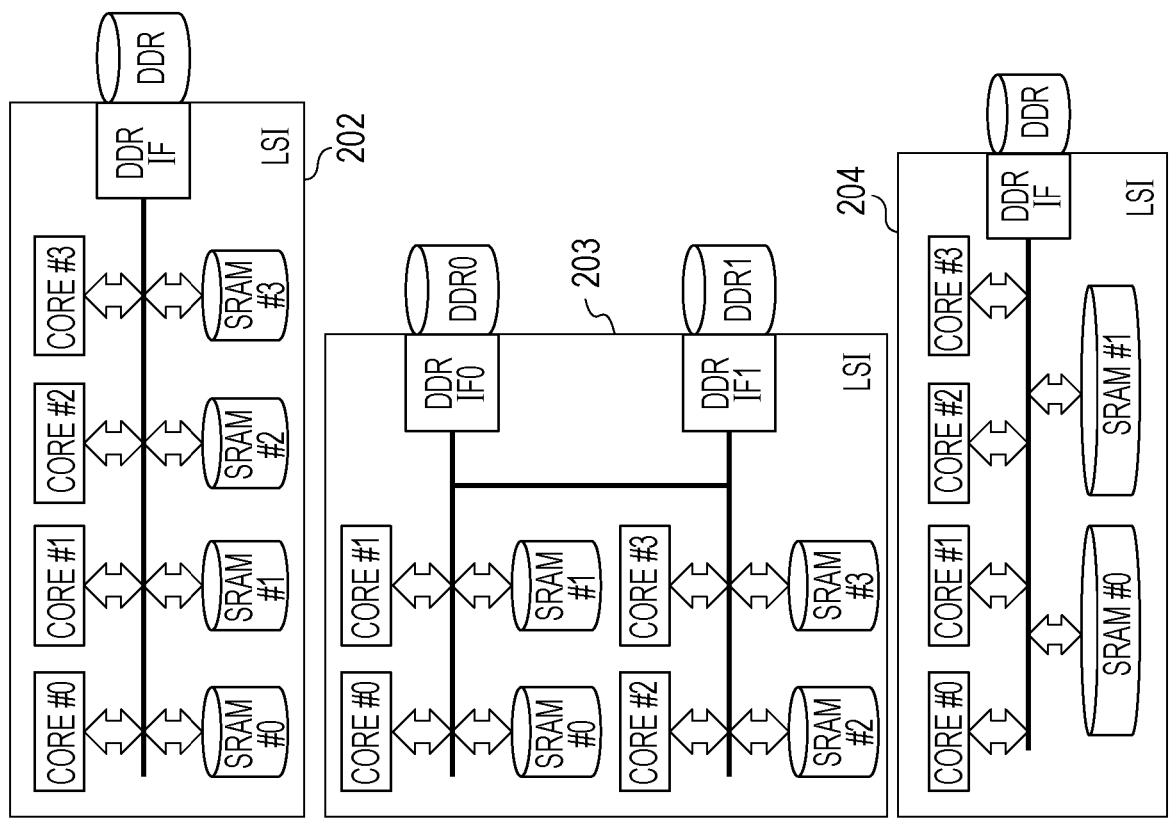
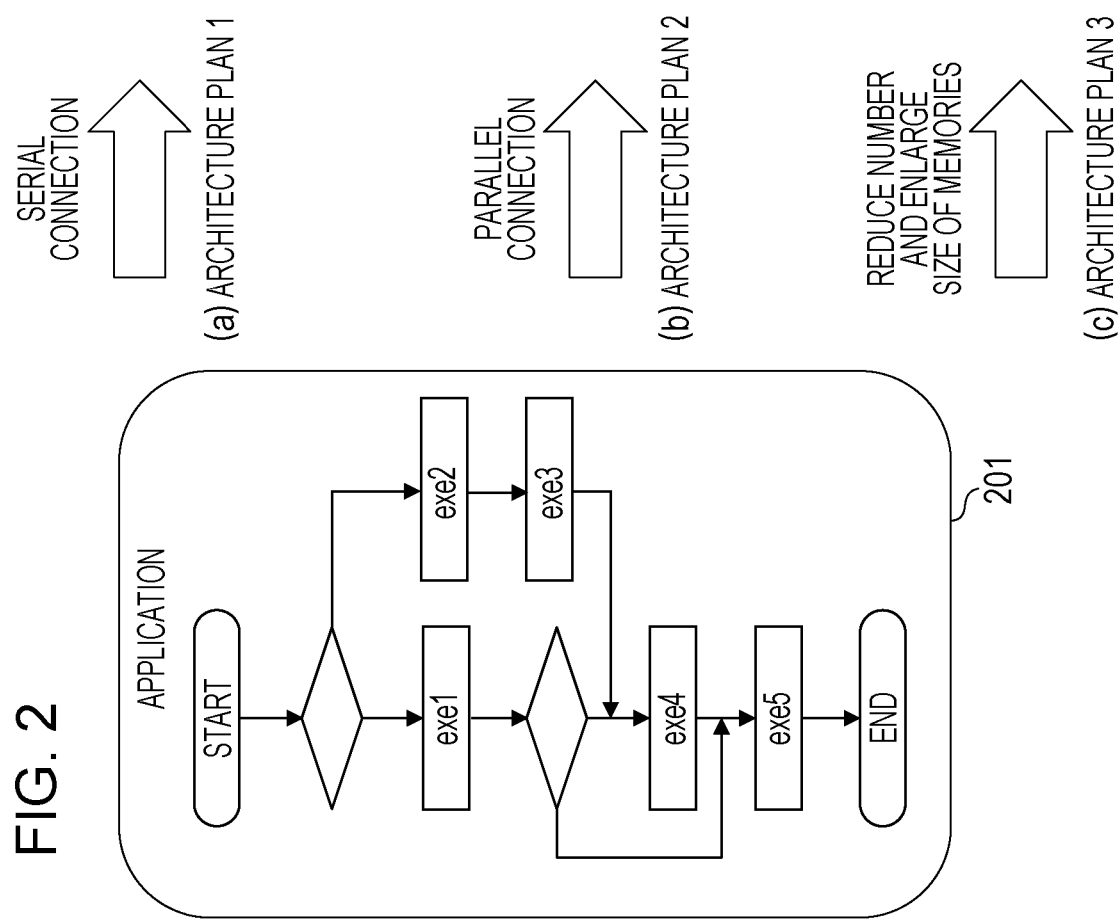

FIG. 12

| No. | PARAMETER | DETAILS |
|---|---|---|
| I | NUMBER OF CREATED COPIES | 100 IF THERE ARE 100 CORES |
| II | PROGRAM ADDRESS OFFSET | DIFFERENCE FROM 0x0 ADDRESS |
| III | PROGRAM SIZE | UPPER LIMIT OF PROGRAM SIZE OF EACH CORE |
| IV | LOAD-STORE ADDRESS OFFSET | DIFFERENCE FROM 0x0 ADDRESS |
| V | LOAD-STORE SIZE | UPPER LIMIT OF MEMORY ADDRESS FOR USE BY EACH CORE |

FIG. 18

| No. | PARAMETER | DETAILS |
|---|---|---|
| I | NUMBER OF CREATED COPIES | 100 IF THERE ARE 100 CORES |
| II | PROGRAM ADDRESS OFFSET OF #1 | DIFFERENCE FROM 0x0 ADDRESS |
| III | PROGRAM SIZE OF #1 | UPPER LIMIT OF PROGRAM SIZE OF EACH CORE |
| IV | LOAD-STORE ADDRESS OFFSET OF #1 | DIFFERENCE FROM 0x0 ADDRESS |
| V | LOAD-STORE SIZE OF #1 | UPPER LIMIT OF MEMORY ADDRESS FOR USE BY EACH CORE |
| VI | PROGRAM ADDRESS OFFSET OF #2 | DIFFERENCE FROM 0x0 ADDRESS |
| VII | PROGRAM SIZE OF #2 | UPPER LIMIT OF PROGRAM SIZE OF EACH CORE |
| VIII | LOAD-STORE ADDRESS OFFSET OF #2 | DIFFERENCE FROM 0x0 ADDRESS |
| IX | LOAD-STORE SIZE OF #2 | UPPER LIMIT OF MEMORY ADDRESS FOR USE BY EACH CORE | ion program, method, and device for an integrated circuit
SIMULATION PROGRAM, METHOD, AND DEVICE

CROSS-REFERENCE TO RELATED APPLICATION

This application is based upon and claims the benefit of priority of the prior Japanese Patent Application No. 2017-133099, filed on Jul. 6, 2017, the entire contents of which are incorporated herein by reference.

FIELD

The embodiments discussed herein are related to a simulation program, method, and device for an integrated circuit including multiple cores.

BACKGROUND

With advances in process technology, the degree of integration of a large scale integrated circuit (LSI) has been so increased that a system LSI may be mounted on a single chip. For example, many multi-core (multiple cores) systems in each of which multiple cores of a central processing unit (CPU) are mounted on a single chip have been developed, and the number of the cores mounted in the single chip has been increased. In these years, it has been desired to implement more complicated architecture in order to satisfy the performance demands, but problems due to such architecture are thus likely to occur. The architecture herein is a hardware configuration of the LSI, which includes the numbers, the sizes, and the connection topology of cores and memories.

In development of such an LSI, there has been known a technique for reducing design man-hours by using hardware designing based on architecture that is determined according to evaluation on not a model with hardware description but an abstracted performance model. When simulating resource contention between cores with this technique, information on bus accesses is extracted from operation results based on the simulations of the cores, and this information is used as resource access operation descriptions for the cores (for example, Japanese Laid-open Patent Publication Nos. 2014-215768 and 2004-021907).

However, since the cores have to be simulated individually in the conventional technique there is a problem that it takes time to perform the simulation when there are a large number of parallel cores.

Thus, an object of one aspect of the present disclosure is to reduce loads and time of processing in simulation of a multi-core configuration.

SUMMARY

According to an aspect of the invention, a simulation method performed by a computer for simulating operations by a plurality of cores based on resource access operation descriptions on the plurality of cores, the method includes steps of: extracting a resource access operation description on at least one core of the plurality of cores by executing simulation for the one core; and, under a condition where the one core and a second core among the plurality of cores have a specific relation in execution processing, generating a resource access operation description on the second core from the resource access operation description on the one core by reflecting an address difference between an address of a resource to which the one core accesses and an address of a resource to which the second core accesses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram that illustrates an example of performance estimation of architecture;

FIG. 12 is a data configuration diagram that illustrates an example of parameters of the first embodiment;

FIG. 18 is a data configuration diagram that illustrates an example of parameters of the second embodiment;

DESCRIPTION OF EMBODIMENTS

Figure 1:
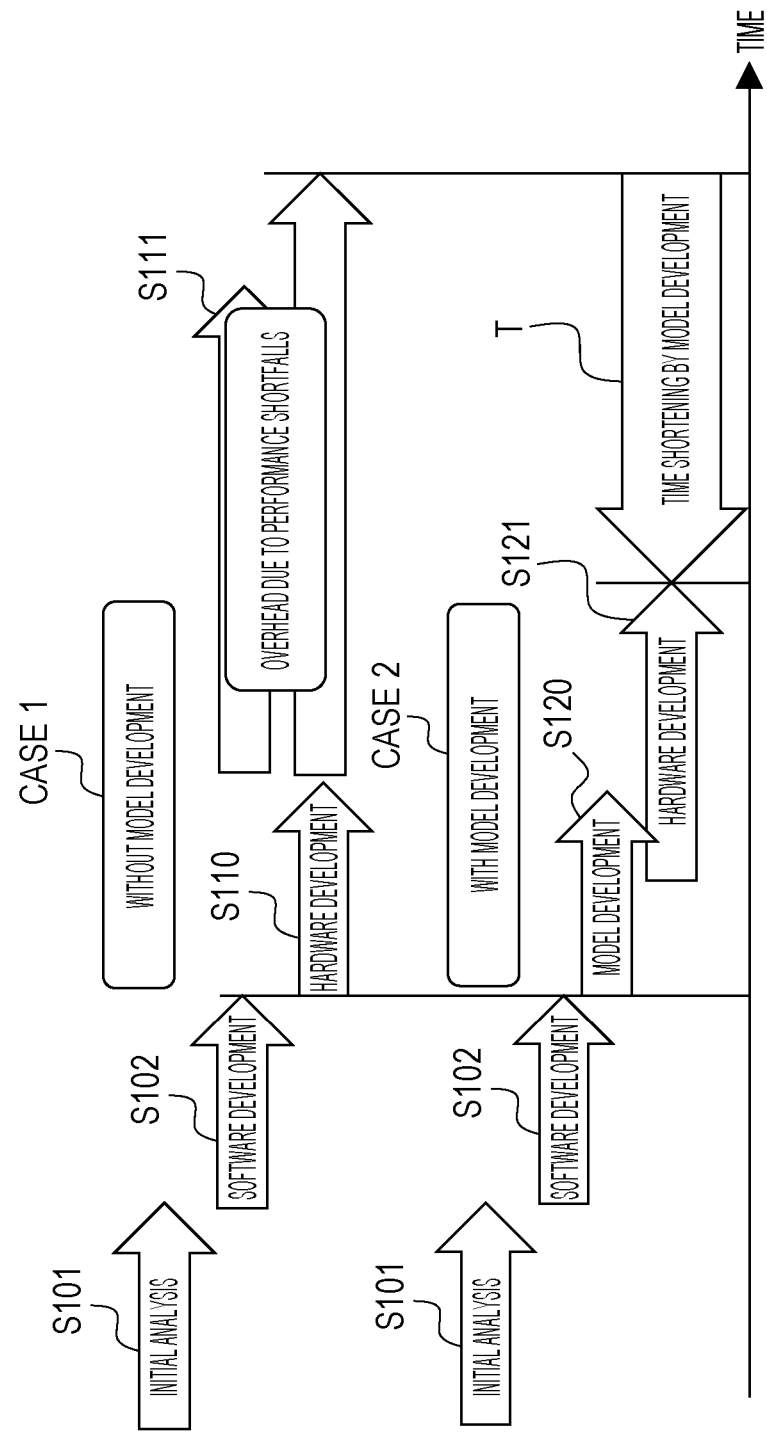
FIG. 1 is an explanatory diagram of development process of a multi-core LSI system.

Hereinafter, embodiments of the present disclosure are described in detail with reference to the drawings. FIG. 1 is an explanatory diagram of development process of a multi-core LSI system to which the embodiments of the present disclosure may be applied.

First, after initial analysis including determination of demand specifications (step S101), software development starts (step S102). In the software development, application software corresponding to a functionality installed in an LSI is developed. For example, communication software of 4G communication functionality is developed for a wireless LSI.

Thereafter, there may be a case 1 without model development and a case 2 with model development as the development process.

When the case 1 without the model development is employed as the development process, hardware that is capable of implementing a functionality of the software developed in the software development in step S102 is directly developed (step S110). In this case, the development is performed while determining topology of the hardware that implements the functionality of the software based on experience. If this hardware does not achieve expected performance, the topology has to be changed. The more architecture becomes complicated, the more performance shortfalls occur after the hardware development, and reworks on the development have to be performed (step S111).

On the other hand, when the case 2 with the model development is employed as the development process, application is moderately determined by the software development in step S102 before the hardware development, and the model development is then performed for estimating the performance of the architecture (step S120). FIG. 2 is a diagram that illustrates an example of the performance estimation of the architecture in the model development. First, application 201 to be implemented is determined by the software development in step S102 of FIG. 1. In this application 201, from start to end of the execution, various processing such as exemplified exe1, exe2, exe3, exe4, and exe5 is executed according to conditional branching. Next, corresponding to such a configuration of the application 201, LSI models 202, 203, and 204 of different architecture plans with different topology and memory configurations are created and then executed as illustrated in (a), (b), (c) of FIG. 2. For example, in the LSI model 202 of an architecture plan 1 of (a) of FIG. 2, cores #0 to #3 as individual processors and static random access memories (SRAMs) #0 to #3 are respectively connected via a bus (serial connection configuration). In the LSI model 203 of an architecture plan 2 of (b) of FIG. 2, a group in which the cores #0 and #1 and the SRAMs #0 and #1 are respectively connected via a bus and a group in which the cores #2 and #3 and the SRAMs #2 and #3 are respectively connected via a bus are made, and these groups are further connected via a bus (parallel connection configuration). In addition, in the LSI model 204 of an architecture plan 3 of (c) of FIG. 2, the SRAMs #2 and #3 are deleted from the LSI model 202 of the architecture plan 1 of (a) of FIG. 2, and each size of the SRAMs #0 and #1 is enlarged. After searching for an LSI model having architecture with high performance (short processing time) from these some developed LSI models, the hardware is designed based on that architecture (step S121 of FIG. 1).

Figure 3:
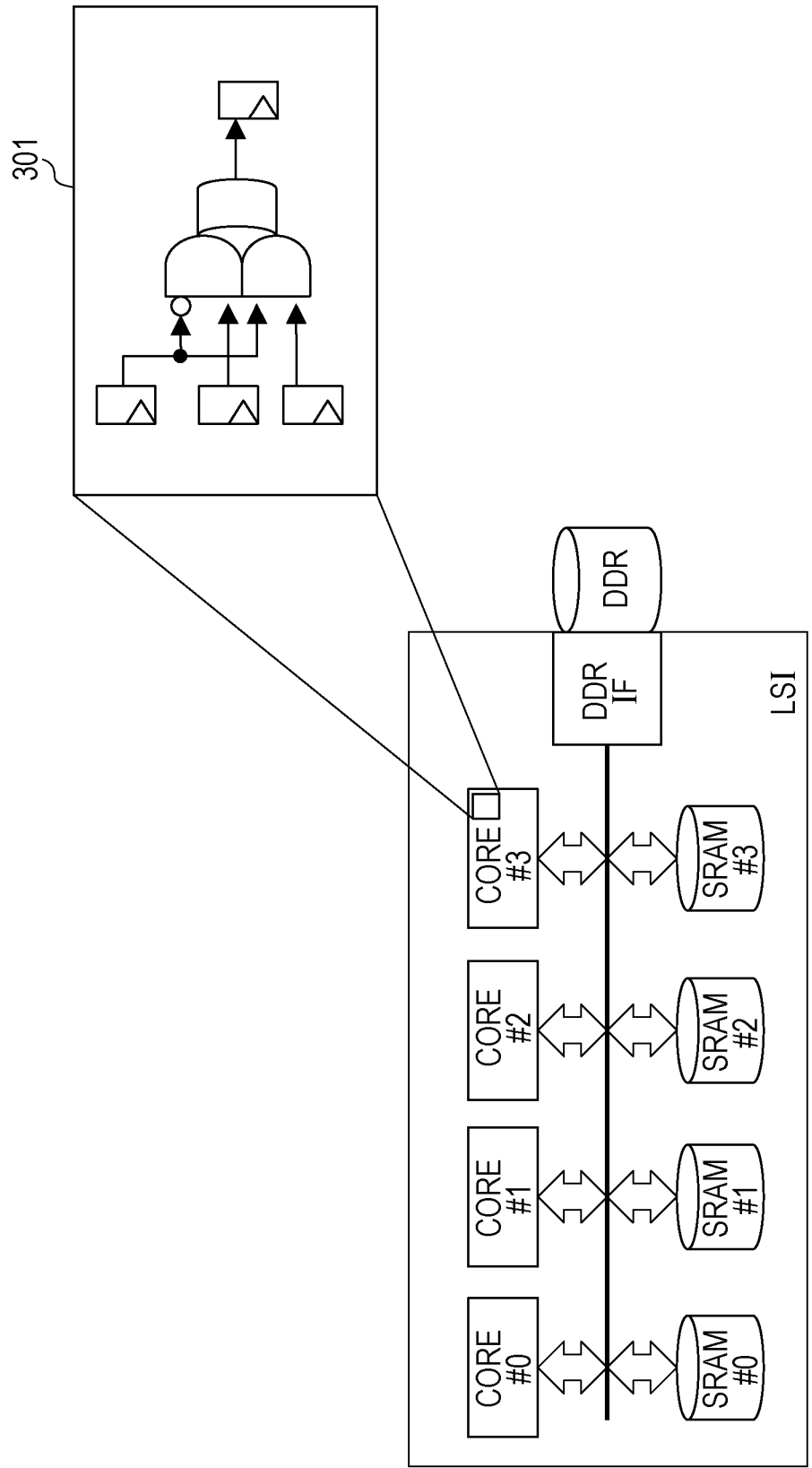
FIG. 3 is an explanatory diagram of a model description of a multi-core LSI system with an RTL model.

There is known a register transfer level (RTL) model as an example of the model employed in the model development. In the RTL model, the minimum part corresponding to a sequential circuit such as a latch circuit having state information is abstracted as a "register" in a logic circuit. Then, operation of the logic circuit is described as a set of transfers each from one register to another register and logical computations performed by combinational logic circuits in the transfers. FIG. 3 is an explanatory diagram of a model description of a multi-core LSI system with the RTL model. When the multi-core LSI system is modeled as the RTL model, the model is described in consideration of the logic circuit in each core, and switching of logics by that logic circuit is simulated as illustrated by 301 in FIG. 3.

However, since the RTL model is a highly detailed model, the LSI system becomes more complicated, and especially in a case of the multi-core configuration, the description using the RTL model becomes more difficult. This results in increase of the number of work steps and increase of simulation time.

Figure 4:
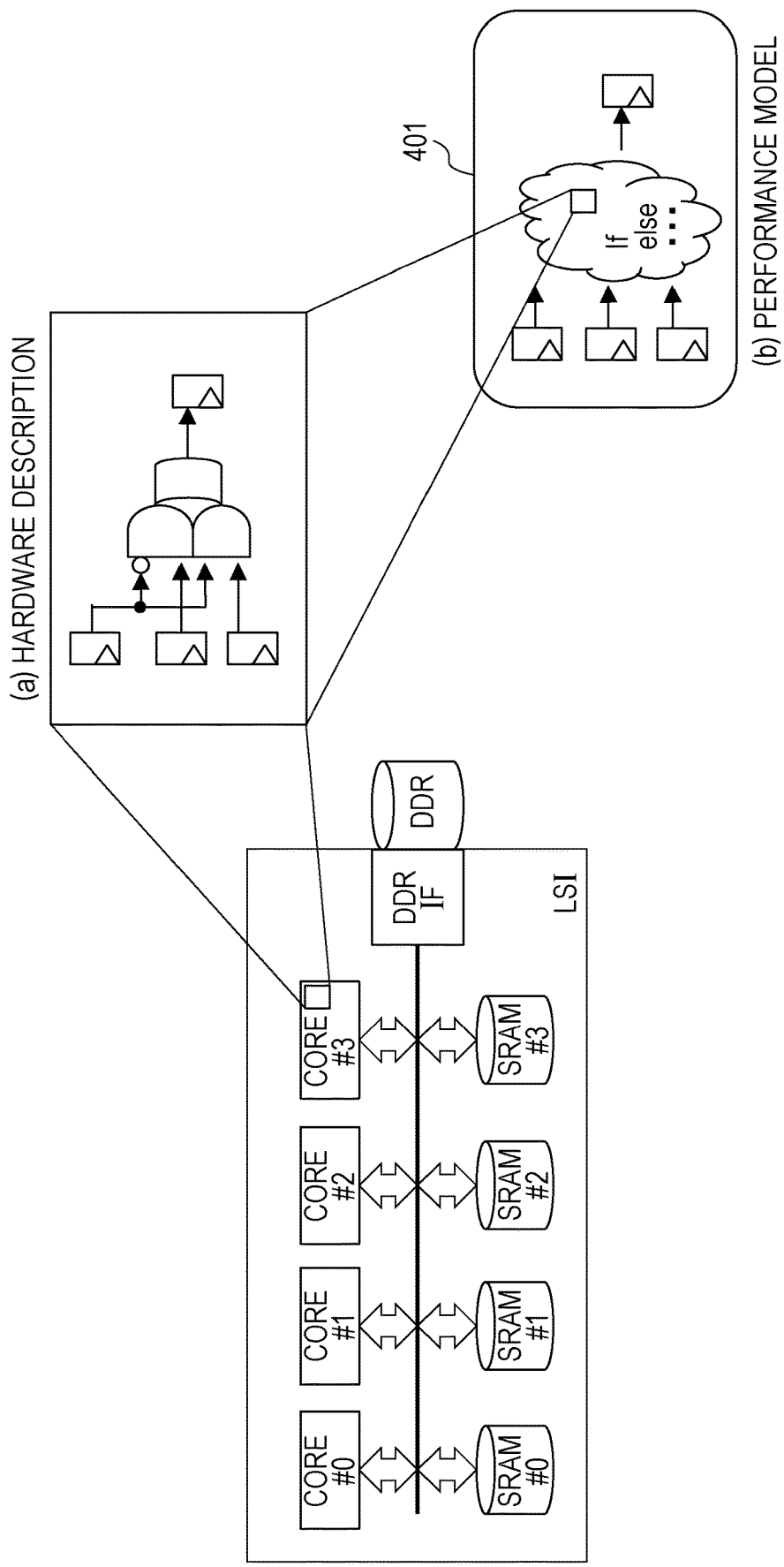
FIG. 4 is an explanatory diagram of a model description of a multi-core LSI system with a performance model.

To deal with this, there is known a performance model as another model example employed in the model development. FIG. 4 is an explanatory diagram of the model description of the multi-core LSI system with the performance model. For example, in the performance model, a hardware description of (a) of FIG. 4 is replaced by a description in a programing language form as a diagram denoted by 401 in (b) of FIG. 4 using a hardware description language called SystemC, which is provided as a class library of the C++ programming language. In this class library, various functions of a functionality, a parallel execution concept, and a time concept for the hardware description are defined. A program may be compiled by a C++ compiler, and a thus generated object operates as a simulator of the hardware. Such a performance model is capable of describing the logic of the hardware in high abstraction level. Use of the performance model makes it possible to develop the LSI system having a complicated configuration.

Figure 5:
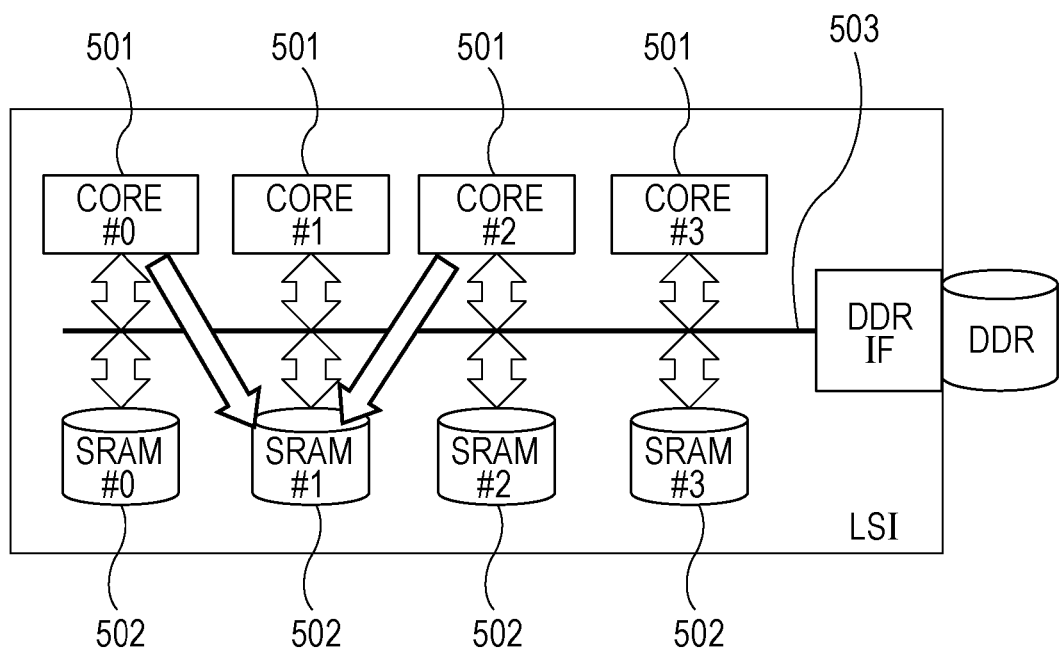
FIG. 5 is an explanatory diagram of resource contention.

Next, development process of the multi-core LSI system including multiple cores is described. Since a simulator for single core usually accompanies the core, the performance estimation with the single core may be made by the performance model such as the above-described SystemC. In this case, resource contention between the multiple cores may occur in the multi-core LSI system. FIG. 5 is an explanatory diagram of the resource contention. In FIG. 5, the resource contention may occur when the core 501(#0) and the core 501(#2) access the same SRAM 502(#1) via a bus 503, for example. However, it is impossible to simulate such resource contention by the above-described performance estimation with the single core.

Figure 6:
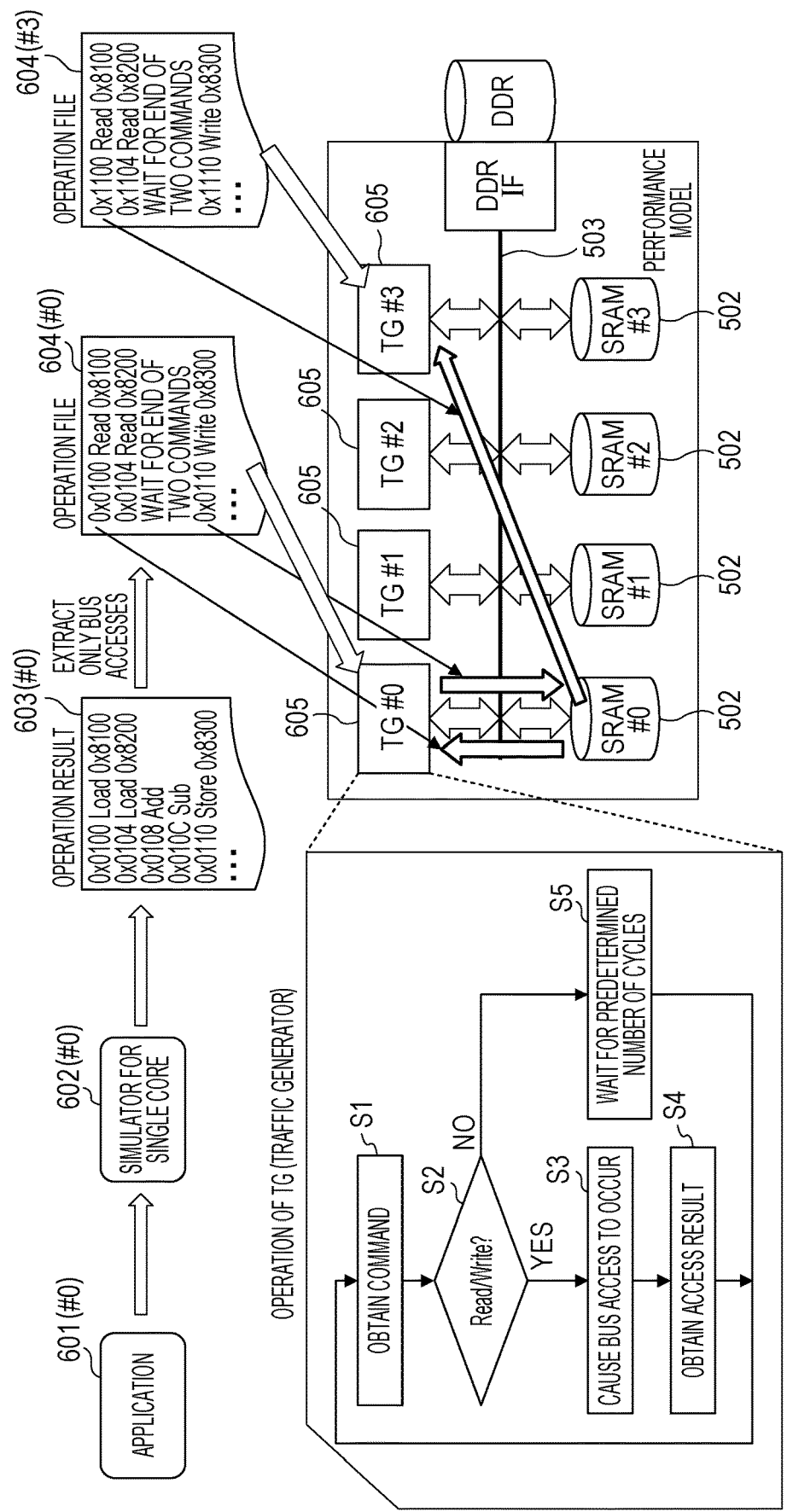
FIG. 6 is an explanatory diagram of a model development method that is capable of duplicating the resource contention while reducing loads of the simulation.

FIG. 6 is an explanatory diagram of a model development method that is capable of duplicating the resource contention while reducing loads of the simulation. FIG. 6 depicts as an example the development of the multi-core LSI system including four cores 501(#0) to 501(#3) and four SRAMs 502(#0) to 502(#3) illustrated in FIG. 5. Description is given below referring to those constituents illustrated in FIG. 5 with reference numbers in FIG. 5.

First, application software 601(#0) for the core 501(#0) developed in step S102 of FIG. 1 is executed by a simulator 602(#0) for single core that simulates the core 501(#0), for example. As a result, log information indicating what command is executed in what time is obtained as an operation result 603(#0).

Next, the operation result 603(#0) is divided into information to be processed in the core 501(#0) and information to be processed outside the core 501(#0) and is extracted as an operation file 604(#0) including log information on commands associated with access via the bus 503.

In the example of FIG. 6, Add and Sub are the commands for only inside the core 501(#0) and not associated with access to the outside. Thus, Add and Sub are combined and replaced with information that indicates waiting for end of two commands (no access to the outside). Commands may be individually replaced with information that indicates waiting for end of one command; however, in a case of ten thousand lines of commands for example, the volume of the information may be made into one hundredth by combining those multiple commands and replacing them with information that indicates waiting for end of the multiple commands.

In the example of FIG. 6, a Load command is a command for reading from, for example, the SRAM 502(#0) outside the core 501(#0); thus, the Load command is recorded as one-time read in the operation file 604(#0). Concurrently, a program counter address (for example, "0x0100") and a load-store address (for example, "0x8100") of that Load command are copied from the operation result 603(#0). Likewise, since a Store command is a command for writing into, for example, the SRAM 502(#0) outside the core 501(#0), the Store command is recorded as one-time write in the operation file 604(#0). Concurrently, the program counter address (for example, "0x0110") and the load-store address (for example, "0x8300") of that Store command are copied from the operation result 603(#0).

There may be following two ways for recording the log information in the operation file 604(#0) in this case. The first way is that to record only the program counter address (for example, "0x0100") as the log information. When programs are sequentially provided from each program address on the SRAM 502(#0) for example, there is description for what to do, and the bus access is performed in accordance with that description. On the other hand, in the second way, operation corresponding to a command (for example, "read" or "write"), the program counter address (for example, "0x0100"), and an address of data to which that command accesses (load-store address) (for example, "0x8100") are recorded as the log information. When simulating execution of that command, the read/write access caused by that command and the read access to the program counter are both executed. The following description employs this second way.

Next, in FIG. 6, corresponding to the cores 501(#0) to 501(#3) (see FIG. 5), simulators called traffic generators (TGs) 605(#0) to 605(#3) are provided. For example, the TG 605(#0) executes sequential processing illustrated as steps S1 to S6 of FIG. 6 by reading the operation file 604(#0) generated as described above. That is, the TG 605(#0) obtains the operation of the commands in the order from top of the operation file 604(#0) (step S1) and determines whether each operation is either "read" or "write" (step S2). When the operation is "read" or "write," the TG 605(#0) causes access to, for example, any one of the SRAMs 502(#0) to 502(#3) via the bus 503 (step S3) and obtains an access result (step S4). When that operation is neither "read" or "write," the TG 605(#0) waits for cycles of the number of the designated commands (step S5). After the processing of steps S4 and S5, the TG 605(#0) returns to step S1 and processes the next command operation.

Likewise, for each of the cores 501(#1) to 501(#3) (see FIG. 5), the processing of obtaining the operation results 603 and the conversion into the operation files 604 are executed based on similar processing by the corresponding simulators 602 for single core as the one described above. On the operation files 604(#1) to 604(#3) (in FIG. 6, only #0 and #3 are illustrated as an example) obtained by the processing, the simulation processing illustrated as steps S1 to S5 are executed by the TGs 605(#1) to 605(#3).

The TGs 605 are usually described with a highly abstracted model having the time concept, such as SystemC. The access operation to the bus 503 in each of the TGs 605(#0) to 605(#3) are also described with SystemC. Assuming that how to behave when the resource contention occurs due to concurrent access to the SRAMs 502(#0) to 502(#3) in FIG. 6 is described with SystemC in advance.

The details of the performance model made by the TGs 605 are similar to those of the technologies discussed in Japanese Laid-open Patent Publication Nos. 2014-215768 and 2004-021907, for example.

As described above, by operating the cores 501 while abstracting them as the TGs 605, desired operation may be executed while reducing loads of the performance model without lowering the accuracy. Specifically, the TGs 605 are able to express the behavior for the resource contention at a certain time.

Figure 7:
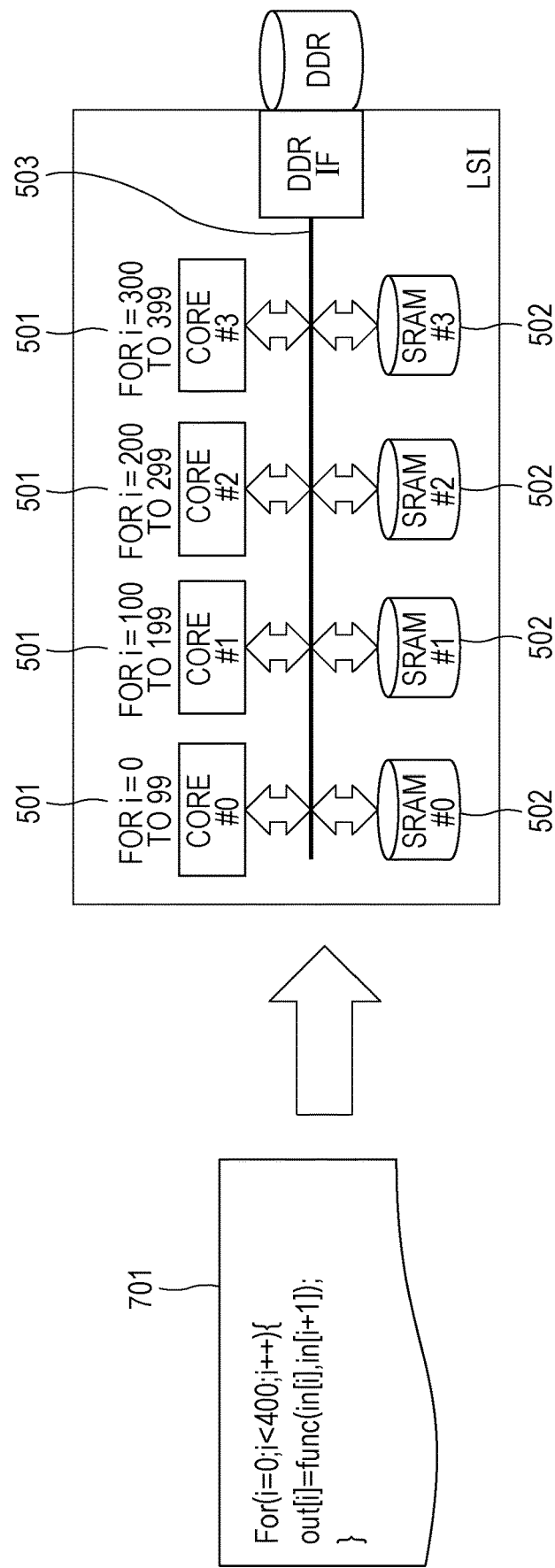
FIG. 7 is an explanatory diagram of parallel processing with multiple cores.
Figure 8:
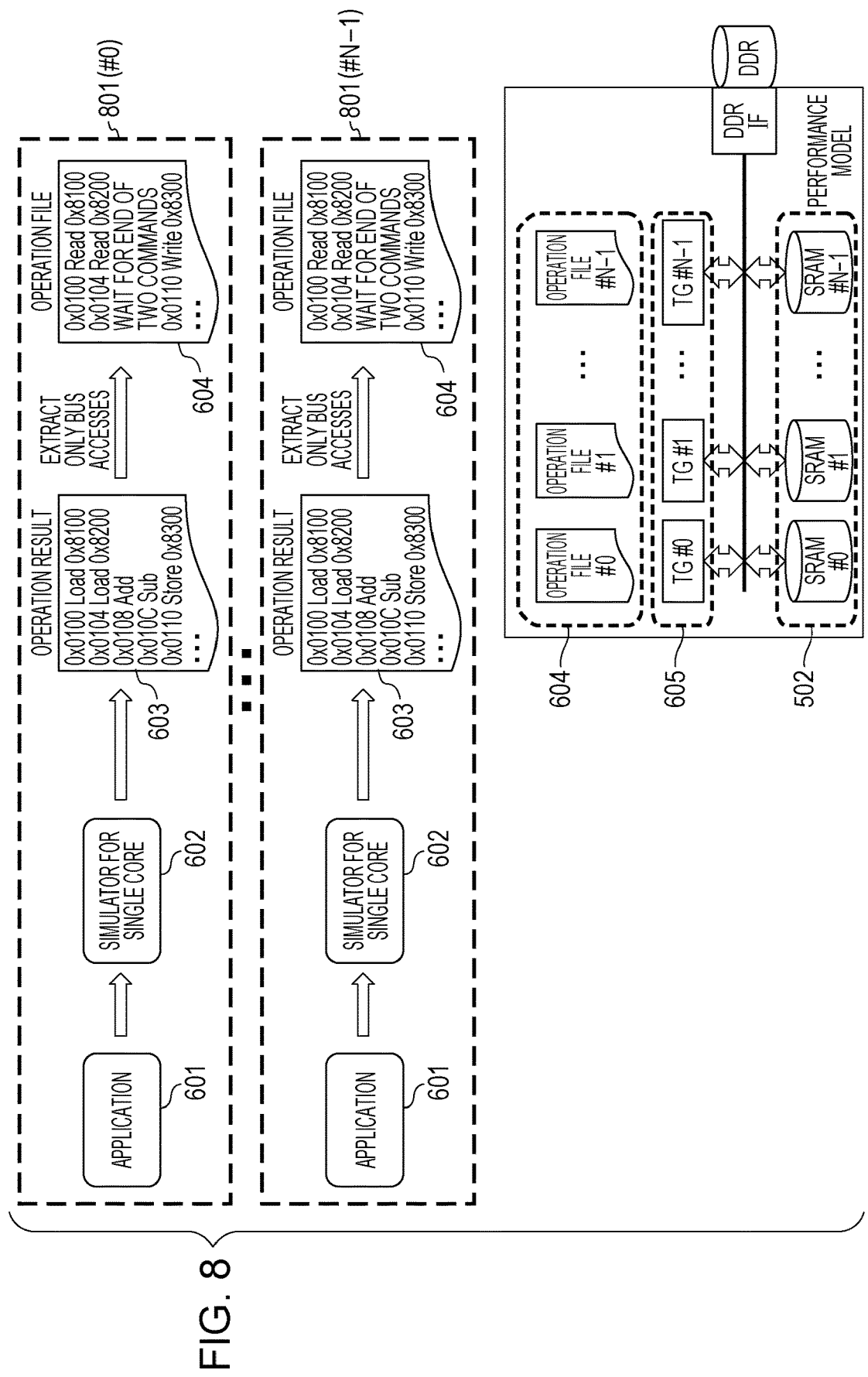
FIG. 8 is an explanatory diagram of a problem of TG simulation on the multiple cores.

Next, FIG. 7 is an explanatory diagram of parallel processing with the multiple cores, and FIG. 8 is an explanatory diagram of a problem of the TG simulation on the multiple cores. For example, as illustrated in a program code 701 in FIG. 7, assuming that there is a program that executes 400 loops of the same function processing (a code indicated as "func" in the diagram). The loops are controlled by a variable i, and loops 0 to 99 are allocated to the core 501(#0), loops 100 to 199 are allocated to the core 501(#1), loops 200 to 299 are allocated to the core 501(#2), and loops 300 to 399 are allocated to the core 501(#3), in parallel. This allocation is determined in a stage of the software development performed by humans (see step S102 of FIG. 1).

The case of FIG. 7 is a case where the multiple cores 501 are allowed to execute processing with the same operation sequence (program) but different input data in parallel. If there are four cores as exemplified in FIG. 7, the conventional method may be used without significant troubles. However, when the multi-core LSI system includes over 100 cores 501 and the number of loops is over ten thousand, sequential processing 801 similar to the processing for generating the operation files 604 in FIG. 6 has to be executed repeatedly for N times (for example, N=100) as illustrated in FIG. 8. That is, the processing of the simulator 602 for single core is repeated for N times. Since the number of the cores 501 is increased as the size of the LSI is enlarged, increase of the simulation time in proportion to the number of the cores makes bottleneck in the development.

Figure 9:
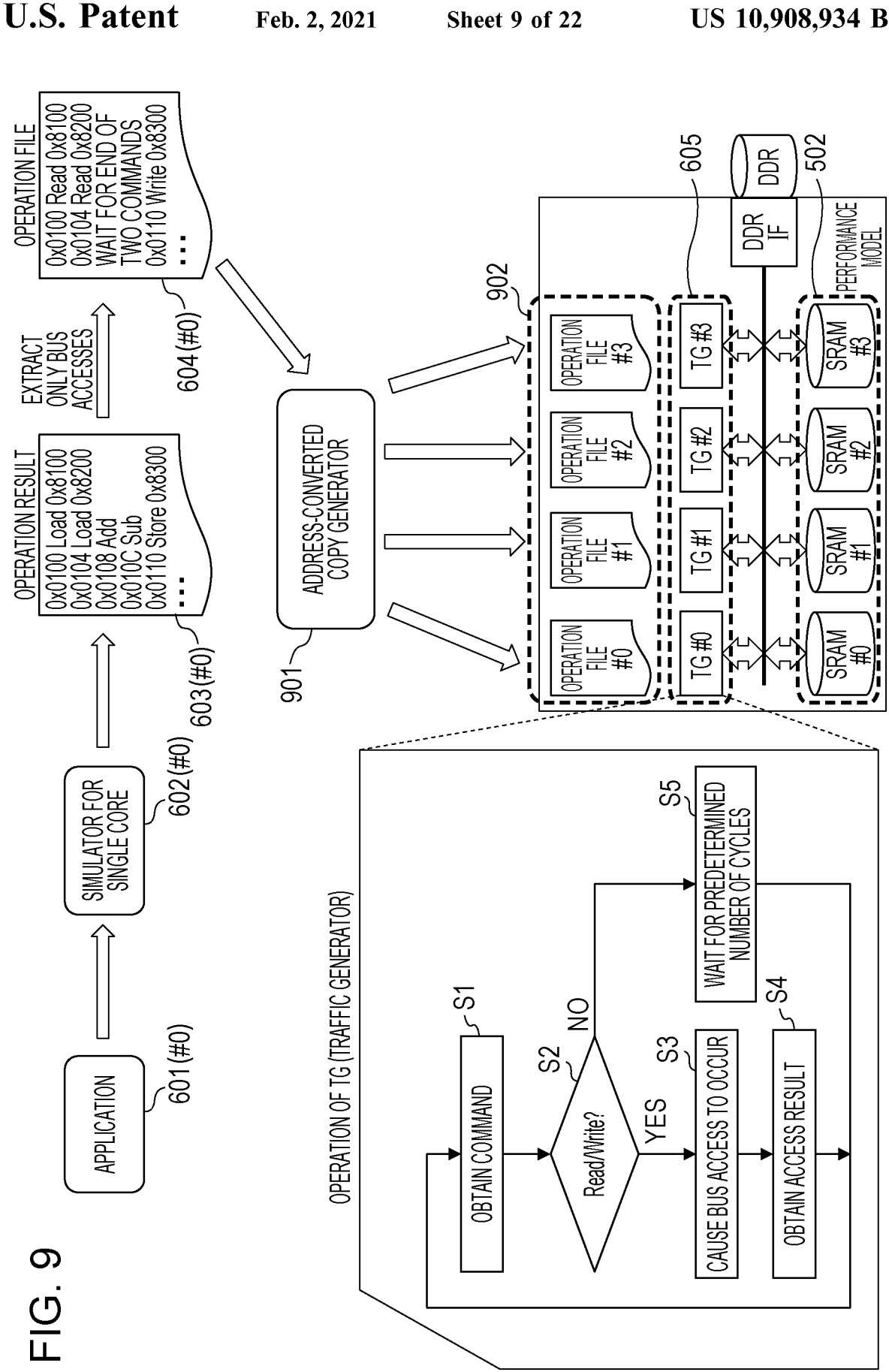
FIG. 9 is an explanatory diagram of a first embodiment.

FIG. 9 is an explanatory diagram of a first embodiment for solving the above-described problem. In the first embodiment, like in the case of FIG. 6, the application software 601(#0) for the core 501(#0) developed in step S102 of FIG. 1 is executed by the simulator 602(#0) for single core that simulates the core 501(#0). As a result, the operation result 603(#0) in which the log information on the command execution is recorded is obtained. In addition, the operation file 604(#0) including the log information on commands associated with the access to the SRAMs 502 via the bus 503 (resource access operation descriptions) is extracted from the operation result 603(#0).

Next, an address-converted copy generator 901 operates under a condition where the multiple cores 501 (in FIG. 9, the cores 501(#0) to 501(#3)) have a specific relation in the execution processing. This specific relation is, for example, that the cores 501(#0) to 501(#3) mutually execute the same repeat processing, which includes the same sequence of commands, on the same or different program address or load-store address.

Under the above-described condition where the cores 501(#0) to 501(#3) have the specific relation, the address-converted copy generator 901 calculates an address difference between an address of a resource to which the core 501(#0) accesses and an address of a resource to which any one of the other cores 501(#1) to 501(#3) accesses. Then, the address-converted copy generator 901 generates operation files 902(#1) to 902(#3) of the other cores 501(#1) to 501(#3) by reflecting this address difference in the operation file 604(#0). Note that the address-converted copy generator 901 directly outputs the operation file 604(#0) of the core 501(#0) as an operation file 902(#0).

To be more specific, the address-converted copy generator 901 inputs the operation file 604(#0) of the core 501(#0) as a reference for generating the other operation files, and offset and size information on the address associated with each of the other cores 501(#1) to 501(#3). The address-converted copy generator 901 reads the operation file 604(#0) as the reference and generates the operation files 902(#1) to 902 (#3) as copies of the post-conversion addresses by each line based on the following equation (1).

$$\text{New Address=Input Address+Offset+Size Information} \times \text{Core Number} \quad (1)$$

When creating the operation files 902 corresponding to 100 cores 501 for example, the address-converted copy generator 901 executes computation according to the above equation (1) for 100 times to obtain 100 different operation files 902.

The TGs 605(#0) to 605(#3) similar to those in the case of FIG. 6 execute simulation exemplified as the processing of steps S1 to S5 in FIG. 9 similar to those in FIG. 6 while reading the operation files 902(#0) to 902(#3) generated by the address-converted copy generator 901.

Figure 10:
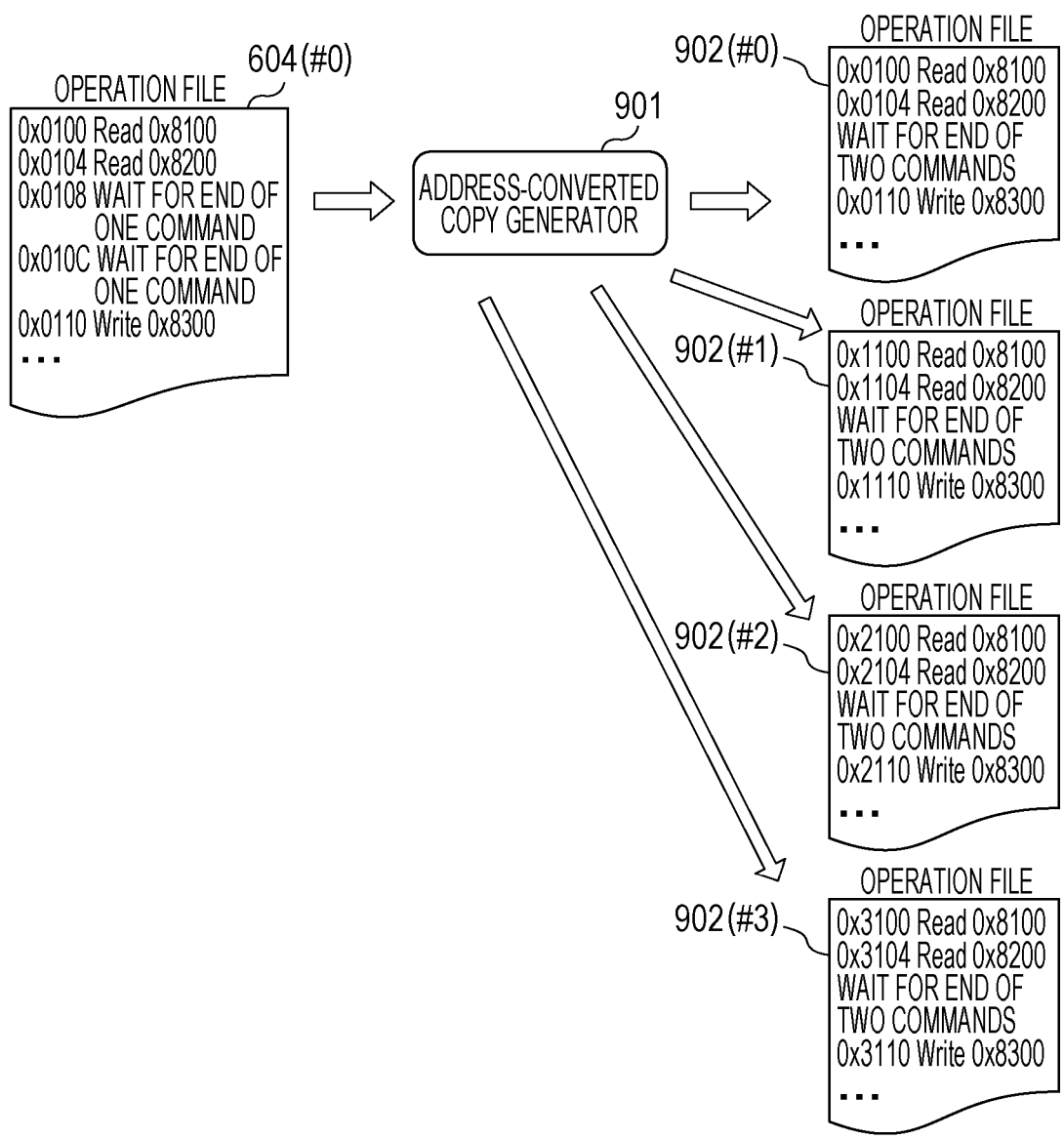
FIG. 10 is an explanatory diagram of operation of an address-converted copy generator.

FIG. 10 is an explanatory diagram of operation of the address-converted copy generator 901. FIG. 10 illustrates an example that the cores 501(#0) to 501(#3) access the same load-store address area (from 0x8100) on the SRAMs 502, and the program address includes the offset=0x0000 and the size information=0x1000. Note that "0x" in the addresses illustrated in FIG. 10 indicates that the address having the numbers following "0x" is a hexadecimal address, and the same applies hereafter.

First, in relation to the core 501(#0), the address-converted copy generator 901 directly copies the operation file 604(#0) to the operation file 902(#0).

Next, in relation to the core 501(#1), the address-converted copy generator 901 reads the log information in each line from the operation file 604(#0) and converts the program addresses 0x0100, 0x0104, 0x0110, and the like of the log information based on the above equation (1). In this case, the offset=0x0000, the size information=0x1000, and the core number=1; thus, the following address converting computation is executed.

0x0100+0x0000+0x1000×1=0x1100
0x0104+0x0000+0x1000×1=0x1104
0x0110+0x0000+0x1000×1=0x1110

In relation to the core 501(#1), the address-converted copy generator 901 outputs the operation file 902(#1) in which the above-described post-conversion program address, the operation ("read" or "write") in each line in the operation file 604(#0), and the load-store address are described. The address-converted copy generator 901 directly outputs the log information indicating "wait for end of command" in the operation file 604(#0) to the operation file 902(#1).

Next, in relation to the core 501(#2), the address-converted copy generator 901 executes address converting operation similar to that in the case of the core 501(#1) and generating operation of the operation file 902(#2). In this case, the offset=0x0000, the size information=0x1000, and the core number=2; thus, the following address converting computation is executed.

0x0100+0x0000+0x1000×2=0x2100
0x0104+0x0000+0x1000×2=0x2104
0x0110+0x0000+0x1000×2=0x2110

In relation to the core 501(#2), the address-converted copy generator 901 outputs the operation file 902(#2) in which the above-described post-conversion program address, the operation ("read" or "write") in each line in the operation file 604(#0), and the load-store address are described.

Next, in relation to the core 501(#3), the address-converted copy generator 901 also executes address converting operation and generating operation of the operation file 902(#3). In this case, the offset=0x0000, the size information=0x1000, and the core number=3; thus, the following address converting computation is executed.

0x0100+0x0000+0x1000×3=0x3100
0x0104+0x0000+0x1000×3=0x3104
0x0110+0x0000+0x1000×3=0x3110

In relation to the core 501(#3), the address-converted copy generator 901 outputs the operation file 902(#3) in which the above-described post-conversion program address, the operation ("read" or "write") in each line in the operation file 604(#0), and the load-store addresses are described.

In the examples of FIGS. 9 and 10, the case where the number of the cores 501 is four, from #0 to #3, is described. The address converting computation with the above equation (1) executed by the address-converted copy generator 901 includes little computation. Thus, even if the number of the cores 501 is 100 for example, the loads of the processing to generate the operation files 902 corresponding to the cores 501 are barely increased as long as the above-described specific relation is established between the cores 501.

The operation of the first embodiment described with reference to FIGS. 9 and 10 makes it possible to achieve reduction of the processing loads of the simulation of the multi-core LSI system and speeding up of the processing. Especially in the multi-core LSI system including many cores, it is possible to significantly reduce the time spent on the single core simulation.

The above-described specific relation does not have to be applied to all of the multiple cores 501 as a design target. In this case, the address-converted copy generator 901 operates on only the cores 501 having that specific relation, and the operation files 902 are generated from the operation file 604(#0).

Figure 11:
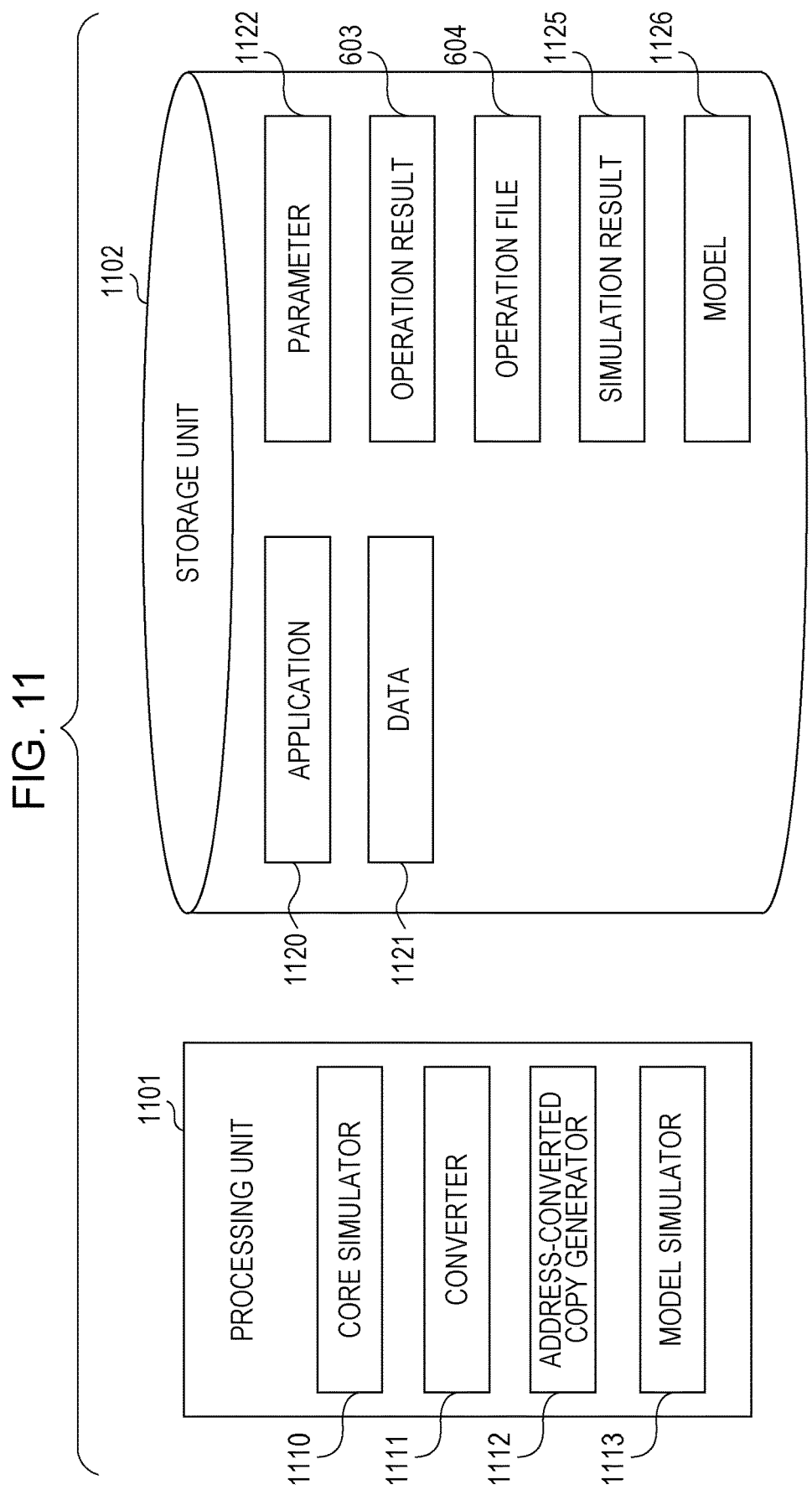
FIG. 11 is a block diagram that illustrates a configuration example of a simulation device of the first embodiment.

FIG. 11 is a block diagram that illustrates a configuration example of a simulation device of the first embodiment that implements the operation of FIGS. 9 and 10. The intended multi-core LSI system is similar to that in the above-described FIG. 5, and description is given below referring to not only those constituents illustrated in FIG. 5 with the reference numbers in FIG. 5 but also the constituents illustrated in FIGS. 9 and 10 with reference numbers in FIGS. 9 and 10. The simulation device of the first embodiment includes a processing unit 1101 and a storage unit 1102.

The processing unit 1101 includes a core simulator 1110, a converter 1111, an address-converted copy generator 1112, and a model simulator 1113.

The core simulator 1110 corresponds to the simulator 602(#0) for single core in FIG. 9 and executes simulation for at least one core of the multiple cores 501 that is, for example, the core 501(#0).

The converter 1111 extracts the operation file 604(#0) (resource access operation descriptions) of the above-described one core out of the cores 501 in the core simulator 1110 that is, for example, the core 501(#0) from the operation result 603(#0) (see FIG. 9) of that one core 501.

The address-converted copy generator 1112 executes the operation similar to that executed by the address-converted copy generator 901 of FIGS. 9 and 10 to generate the operation files 902(#0) to 902(#3) corresponding to the cores 501(#0) to 501(#3), for example.

The model simulator 1113 corresponds to the TGs 605 of FIG. 9 and executes the simulation of the resource contention between the multiple cores 501(#0) to 501(#3) based on the operation files 902 of, for example, the cores 501(#0) to 501(#3) generated by the address-converted copy generator 1112.

The storage unit 1102 stores application 1120, data 1121, a parameter 1122, the operation result 603(#0), the operation files 604(#0) and 902(#0) to 902(#3), a simulation result 1125, and a model 1126.

The application 1120 corresponds to the application 601 (#0) of FIG. 9. The data 1121 is various kinds of data used in the application 1120.

The parameter 1122 is control data to which the address-converted copy generator 1112 refers when executing the address conversion.

The operation result 603(#0) and the operation files 604(#0) and 902(#0) to 902(#3) correspond to the data described in FIGS. 9 and 10.

The simulation result 1125 is data as a result from the simulation executed by the model simulator 1113.

The model 1126 is a simulator program of the model simulator 1113. FIG. 12 is a data configuration diagram that illustrates an example of the parameter 1122 (see FIG. 11) to which the address-converted copy generator 1112 refers in the simulation device of the first embodiment in FIG. 11.

A parameter I is the number of created copies of the operation files 902, and if there are 100 cores 501 having the above-described specific relation for example, I=100.

A parameter II is an offset value of the program address, which is a difference value from 0x0000 address (indicated as "0x0 address" in FIG. 12) of memory address space uniquely defined by the multi-core LSI system as the design target.

A parameter III is a program size value that is an upper limit value of the program size of each of the cores 501.

A parameter IV is an offset value of the load-store address, which is a difference value from 0x0000 address (indicated as "0x0 address" in FIG. 12) of memory address space uniquely defined by the multi-core LSI system as the design target.

A parameter V is a load-store size value that is an upper limit value of a memory address area used for each of the cores 501.

Figure 13:
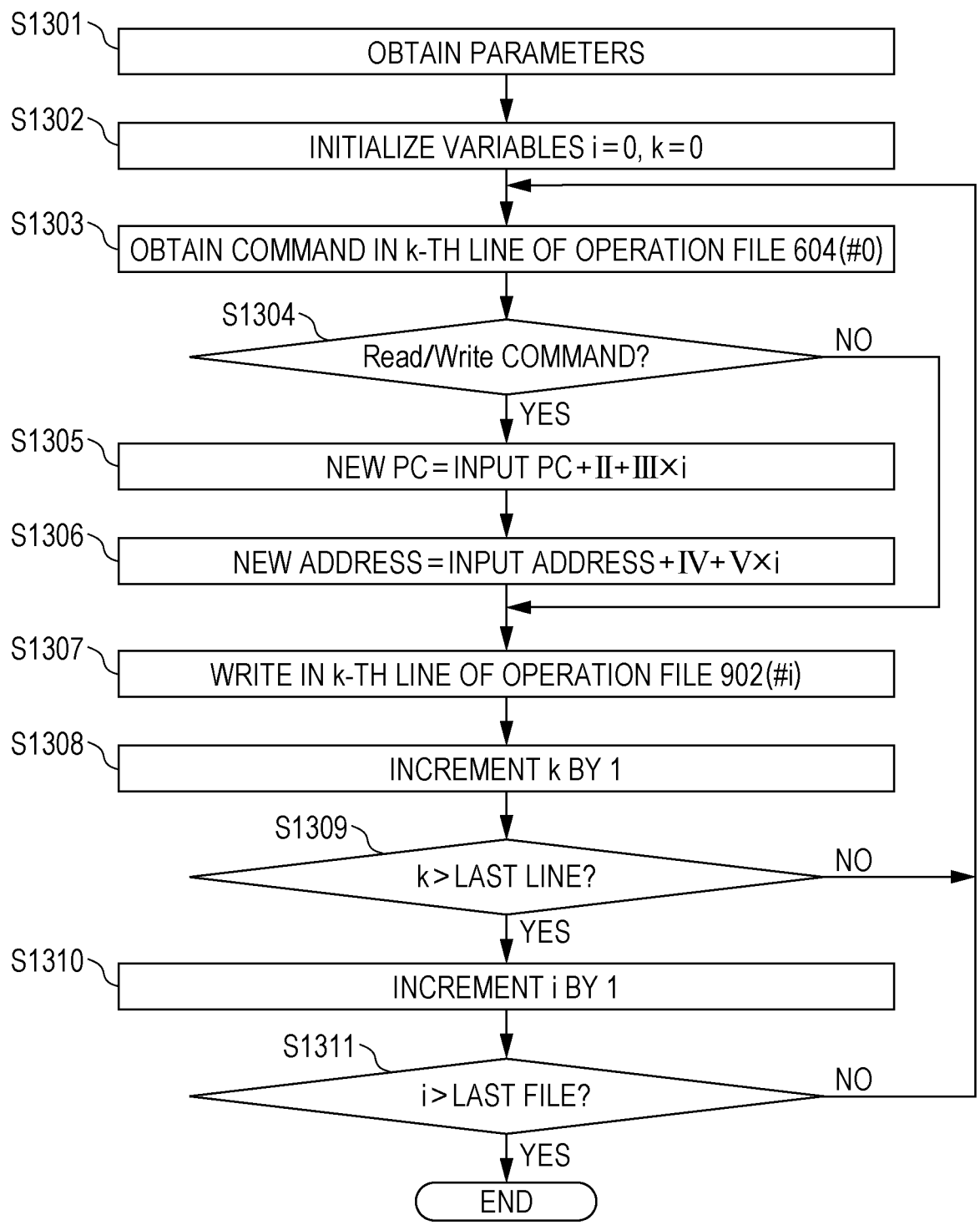
FIG. 13 is a flowchart that illustrates an operation example of the address-converted copy generator of the first embodiment.

FIG. 13 is a flowchart that illustrates an operation example of the processing executed by the address-converted copy generator 1112 in the processing unit 1101 in the simulation device of the first embodiment in FIG. 11. Hereinafter, description is given below referring to those constituents illustrated in FIG. 11 with reference numbers in FIG. 11.

First, the address-converted copy generator 1112 obtains the parameters I to V in the parameter 1122 from the storage unit 1102 (step S1301).

Next, the address-converted copy generator 1112 initializes both the variable i and a variable k to 0 (step S1302). The variable i indicates a number of each of the cores 501, and the variable k indicates a number of each line in the operation file 604(#0).

Next, the address-converted copy generator 1112 increments the value of the variable k indicating the line number initialized to 0 in step S1302 by 1 in step S1308 and repeatedly executes the sequential processing from step S1303 to step S1308 for each line in the operation file 604(#0) until determining that the value of the variable k exceeds the value corresponding to the last line in step S1309.

First, the address-converted copy generator 1112 obtains operation of the command in a k-th line indicated by the variable k of the operation file 604(#0) generated by the converter 1111 of FIG. 11 (step S1303).

The address-converted copy generator 1112 determines whether the operation of the command obtained in step S1303 is either "read" or "write" (step S1304).

If the determination in step S1304 is YES, the address-converted copy generator 1112 executes the computation processing based on the following equation (2) corresponding to the above-described equation (1) to convert the program address (step S1305). In this equation (2), Input PC is a program counter value (program address) added to the operation of the command in the k-th line. II is the parameter II (program address offset) described in FIG. 12. III is the parameter III (program size) described in FIG. 12. i is a current value of the variable i. New PC is a post-conversion program counter value (program address) to be written to the operation file 902(#i).

$$\text{New PC} = \text{Input PC} + \text{II} + \text{III} \times i \quad (2)$$

Next, the address-converted copy generator 1112 executes the computation processing based on the following equation (3) corresponding to the above-described equation (1) to convert the load-store address (step S1306). In this equation (3), Input Address is a load-store address added to the operation of the command in the k-th line. IV is the parameter IV (load-store address offset) described in FIG. 12. V is the parameter V (load-store size) described in FIG. 12. i is a current value of the variable i. New Address is a post-conversion load-store address to be written to the operation file 902(#i).

$$\text{New Address} = \text{Input Address} + \text{IV} + \text{V} \times i \quad (3)$$

The address-converted copy generator 1112 writes the program address calculated in step S1305 and the load-store address calculated in step S1306 to the k-th line of the operation file 902(#i) with the operation of the command recorded in the k-th line of the operation file 604(#0) (step S1307).

When the operation of the command obtained in step S1303 is neither "read" or "write" and is the command of waiting (see the operation file 604(#0) of FIG. 9) (when the determination in step S1304 is NO), the address-converted copy generator 1112 executes the following operation. The address-converted copy generator 1112 skips the processing of the above-described steps S1305 and S1306 and writes the operation of the command in the k-th line in the operation file 604(#0) to the k-th line in the operation file 902(#i) in step S1307.

When the value of the variable k exceeds the last line in the operation file 604(#0) (when the determination in step S1309 is YES) as a result of repeating the above-described sequential processing for each line in the operation file 604(#0), the address-converted copy generator 1112 executes the following processing. The address-converted copy generator 1112 increments the value of the variable i by 1 (step S1310). The address-converted copy generator 1112 then determines whether the value of the variable i exceeds a value corresponding to last one of the operation files 902 to be generated (=last one of the cores 501 to be generated) (step S1311). If the determination in step S1311 is NO, the address-converted copy generator 1112 resets the value of the variable k to 0 and thereafter returns to the processing of step S1303 and moves to the next generation processing of the operation file 902(#i).

When the determination in step S1311 is YES as a result of repeating the above-described sequential processing, the address-converted copy generator 1112 completes all the processing and ends the processing exemplified in the flowchart of FIG. 13, and the processing unit 1101 then starts to control the model simulator 1113 of FIG. 11.

Figure 14:
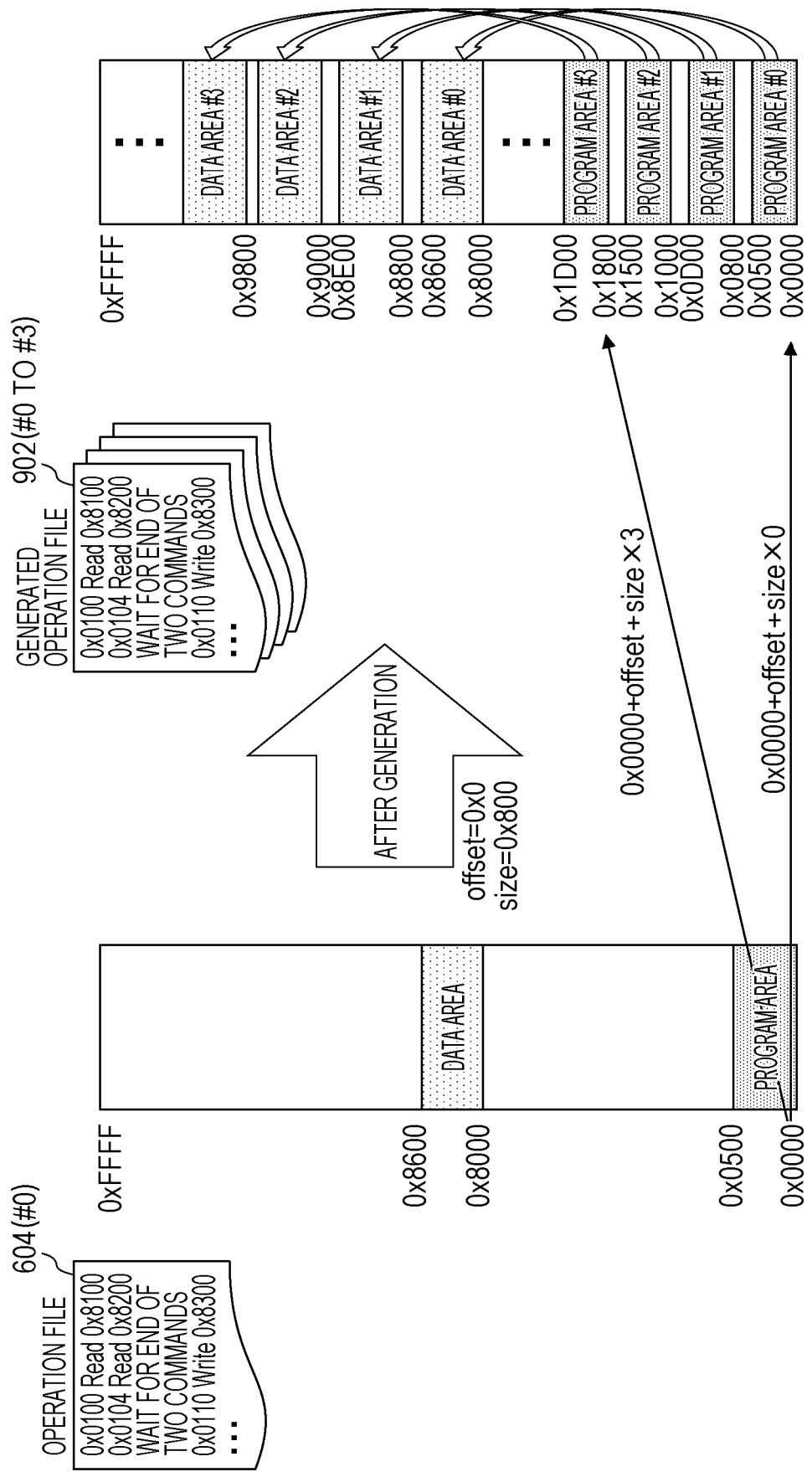
FIG. 14 is a first explanatory diagram of address conversion in the first embodiment.
Figure 15:
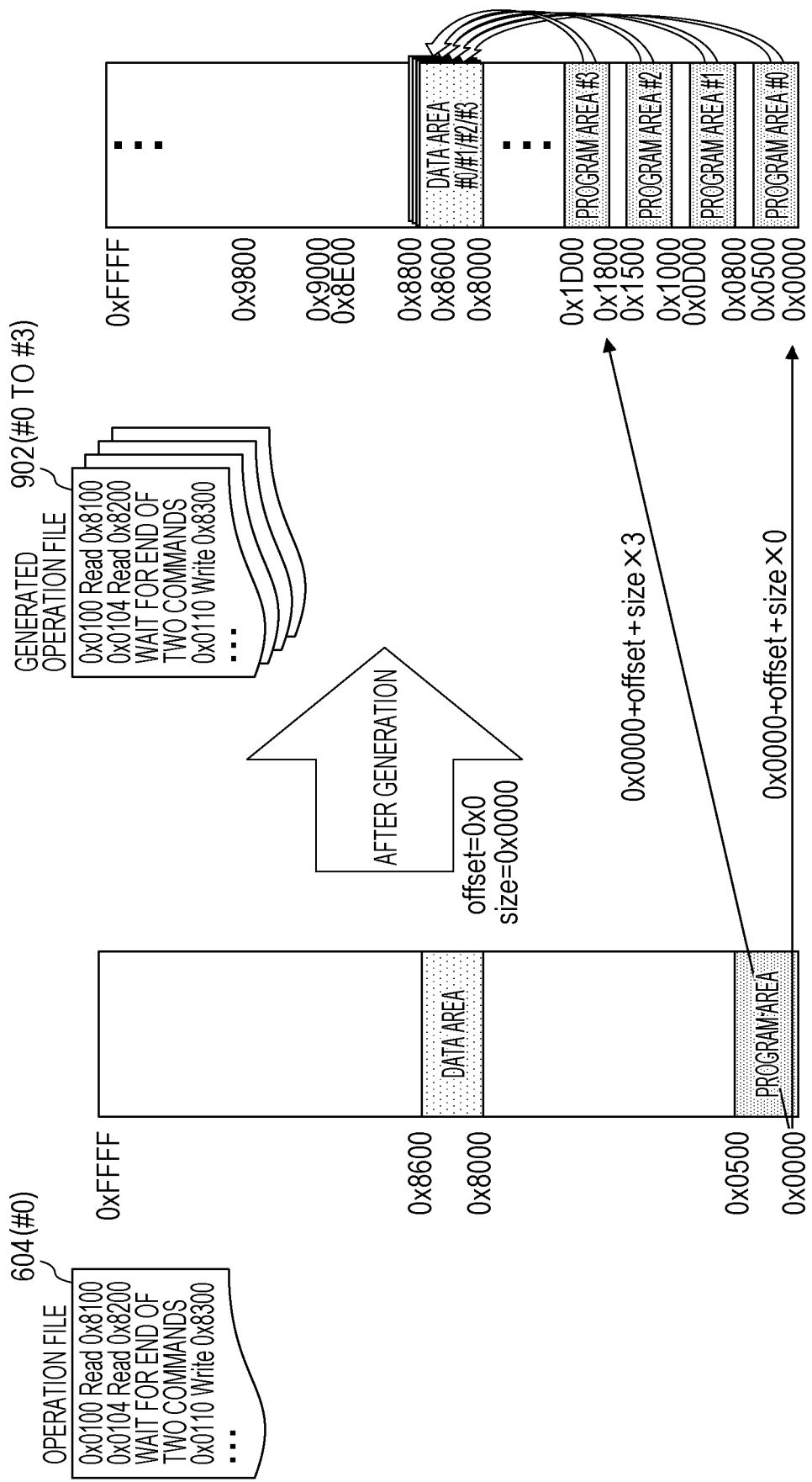
FIG. 15 is a second explanatory diagram of address conversion in the first embodiment.

FIGS. 14 and 15 are explanatory diagrams of address conversion performed by the address-converted copy generator 1112 in the processing of the flowchart of FIG. 13. FIG. 14 is an example of the address conversion when each of the program areas and each of the data areas do not both overlap between the cores 501(#0) to 501(#3). Meanwhile, FIG. 15 is an example of the address conversion when each of the program areas do not overlap but each of the data areas may overlap between the cores 501(#0) to 501(#3).

First, in FIG. 14, the program size of the parameter II described in FIG. 12 is set to 0x800, for example. As a result, when generating the operation file 902(#1), the program address of the operation of each command in the operation file 604(#0) is converted from an address in a program area between 0x0000 and 0x0500 to an address in a program area between 0x0800 and 0x0D00. Likewise, when generating the operation file 902(#2), the program address is converted from the address in the program area between 0x0000 and 0x0500 to an address in a program area between 0x1000 and 0x1500. Further, when generating the operation file 902(#3), the program address is converted from the address in the program area between 0x0000 and 0x0500 to an address in a program area between 0x1800 and 0x1D00. The program area of the operation file 902(#0) is the same as the program area between 0x0000 and 0x0500 in the operation file 604(#0).

Next, in FIG. 14, the load-store size of the parameter V described in FIG. 12 is set to 0x800, for example. As a result, when generating the operation file 902(#1), the load-store address of the operation of each command in the operation file 604(#0) is converted from an address in a data area between 0x8000 and 0x8600 to an address in a data area starting from 0x8800. Likewise, when generating the operation file 902(#2), the load-store address is converted from the address in the data area between 0x8000 and 0x8600 to an address in a data area starting from 0x9000. Further, when generating the operation file 902(#3), the load-store address is converted from the address in the program area between 0x8000 and 0x8600 to an address in a data area starting from 0x9800. The data area of the operation file 902(#0) is the same as the data area between 0x8000 and 0x8600 in the operation file 604(#0).

Next, as for the program areas in FIG. 15, when the program size of the parameter II described in FIG. 12 is set to, for example, 0x800, the conversion processing similar to that in the case of FIG. 14 is executed.

Meanwhile, as for the data areas in FIG. 15, when the load-store size of the parameter V described in FIG. 12 is set to 0x0000, the load-store address of the operation of the command in the operation file 604(#0) remains unchanged as the address in the data area between 0x8000 and 0x8600.

In this way, based on the operation file 604(#0) of the single core 501(#0), the address-converted copy generator 1112 is able to generate, for example, the operation files 902(#1) to 902(#3) of the cores 501(#1) to 501(#3) having the specific relation with that core 501(#0). Thus, especially in the multi-core LSI system including many cores, it is possible to significantly reduce the time spent on the single core simulation.

Figure 16:
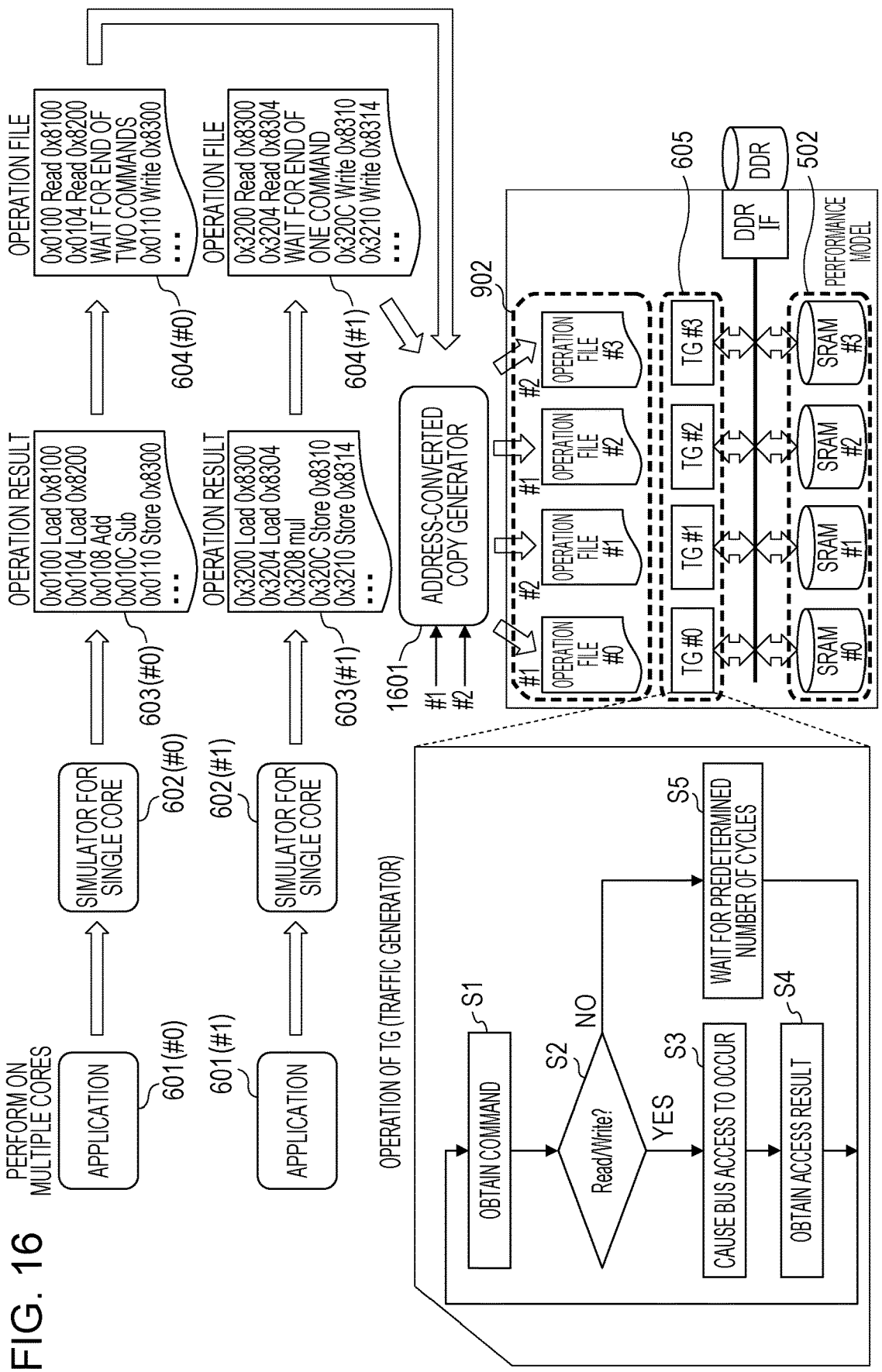
FIG. 16 is an explanatory diagram of a second embodiment.

FIG. 16 is an explanatory diagram of a second embodiment. Although there is one sequence (program) of the application that is the application 601(#0) for the core 501(#0) in the first embodiment described in FIGS. 9 and 10, there are two sequences (programs) of the applications that are, for example, the application 601(#0) for the core 501(#0) and the application 601(#1) for the core 501(#1) in the second embodiment in FIG. 16. Accordingly, there are two sequences for the cores 501(#0) and 501(#1) each involving the execution of the simulator 602 for single core, and the output of the operation result 603 and the conversion into the operation file 604 based on that execution.

When generating the operation file 902(#i), an address-converted copy generator 1601 generates the operation file 604(#i) based on the operation file 604(#0) when #1 is provided as an application number, and operates to generate the operation file 604(#i) based on the operation file 604(#1) when #2 is provided as the application number.

In this way, a simulation device of the second embodiment makes it possible to generate the operation files 902 with multiple sequences that correspond to different sequences. In FIG. 16, for example, it is possible to control the operation files 902(#0) and 902(#2) to operate with sequence corresponding to the application number #1 and control the operation files 902(#1) and 902(#3) to operate with sequence corresponding to the application number #2.

Figure 17:
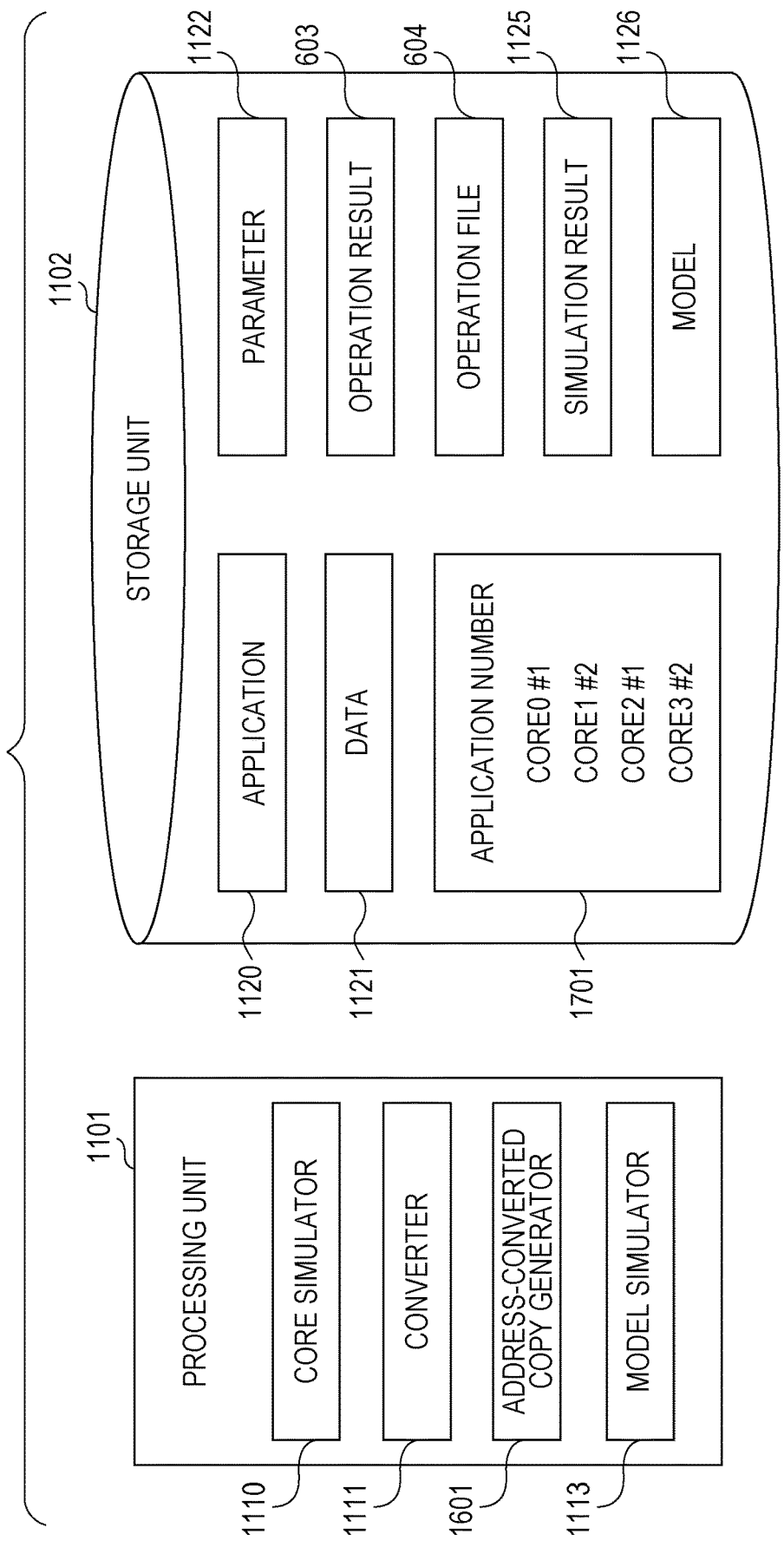
FIG. 17 is a block diagram that illustrates a configuration example of a simulation device of the second embodiment.

FIG. 17 is a block diagram that illustrates a configuration example of the simulation device of the second embodiment that implements the operation of FIG. 16. This is different from the first embodiment in FIG. 11 in that the address-converted copy generator 1601 (similar to that in FIG. 16) operates based on an application number 1701 in the storage unit 1102.

The application number 1701 is information that designates an application number #1 or #2 for each of the cores 501(#0) to 501(#3).

FIG. 18 is a data configuration diagram that illustrates an example of the parameter 1122 (see FIG. 11) to which the address-converted copy generator 1601 refers in the simulation device of the second embodiment in FIG. 17. The parameters I to V are similar to those described in FIG. 12. In the second embodiment, parameters VI to IX are further provided as a second data set similar to the parameters I to V.

Figure 19:
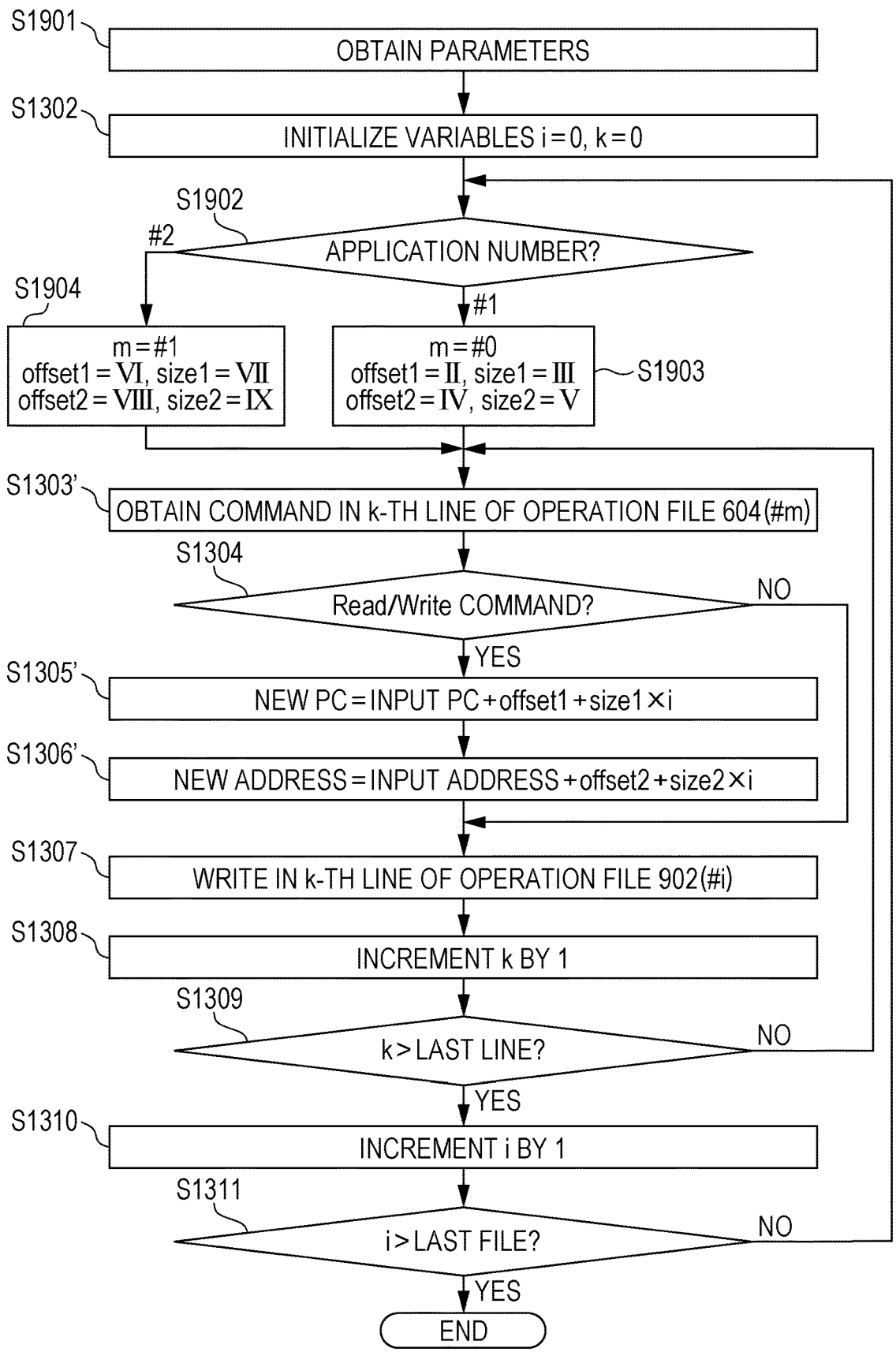
FIG. 19 is a flowchart that illustrates an operation example of an address-converted copy generator of the second embodiment.

FIG. 19 is a flowchart that illustrates an operation example of processing executed by the address-converted copy generator 1601 in the processing unit 1101 in the simulation device of the second embodiment in FIG. 16. In the flowchart of FIG. 19, the same processing as in the case of FIG. 13 according to the first embodiment is executed in a step denoted by the same step number of the flowchart of FIG. 13.

The flowchart of FIG. 19 is different from the flowchart of FIG. 13 in that, first, the address-converted copy generator 1601 obtains the above-described parameters I to IX in the parameter 1122 from the storage unit 1102 (step S1901).

Next, every time a value of the variable i indicating the number of one of the cores 501 for generating the operation file 902 changes, the address-converted copy generator 1601 obtains the value of the application number 1701 set in that core 501 corresponding to the value of the variable i from the storage unit 1102 of FIG. 17. The address-converted copy generator 1601 then determines whether the value of that application number 1701 is #1 or #2 (step S1902).

When the value of the application number 1701 is #1, the address-converted copy generator 1601 sets a value of a variable m indicating a number of the operation file 604 as a reading source to #0. The address-converted copy generator 1601 sets a variable offset1 indicating an offset value for the program address conversion and a variable size1 indicating the program size to the values of the parameters II and III (see FIG. 18) obtained in step S1901, respectively. In addition, the address-converted copy generator 1601 sets a variable offset2 indicating an offset value for the road-store address conversion and a variable size2 indicating the load-store size to the values of the parameters IV and V (see FIG. 18) obtained in step S1901, respectively (step S1903).

On the other hand, when the value of the application number 1701 is #2, the address-converted copy generator 1601 sets the value of the variable m indicating the number of the operation file 604 as the reading source to #1. The address-converted copy generator 1601 sets the variable offset1 indicating the offset value for the program address conversion and the variable size1 indicating the program size to the values of the parameters VI and VII (see FIG. 18) obtained in step S1901, respectively. In addition, the address-converted copy generator 1601 sets the variable offset2 indicating the offset value for the road-store address conversion and the variable size2 indicating the load-store size to the values of the parameters VIII and IX (see FIG. 18) obtained in step S1901, respectively (step S1904).

In step S1303' of FIG. 19 corresponding to step S1303 of FIG. 13, the address-converted copy generator 1601 obtains the command in the k-th line of the operation file 604 having the number indicated by the variable m set in step S1903 or S1904.

In step S1305' of FIG. 19 corresponding to step S1305 of FIG. 13, the address-converted copy generator 1601 calculates a new program address using the variables offset1 and size1 set in step S1903 or S1904.

In addition, in step S1306' of FIG. 19 corresponding to step S1306 of FIG. 13, the address-converted copy generator 1601 calculates a new program address using the variables offset2 and size2 set in step S1903 or S1904.

According to the above-described operation of the address-converted copy generator 1601 of the second embodiment, it is possible to generate the operation files 902 with multiple sequences that correspond to different sequences.

Figure 20:
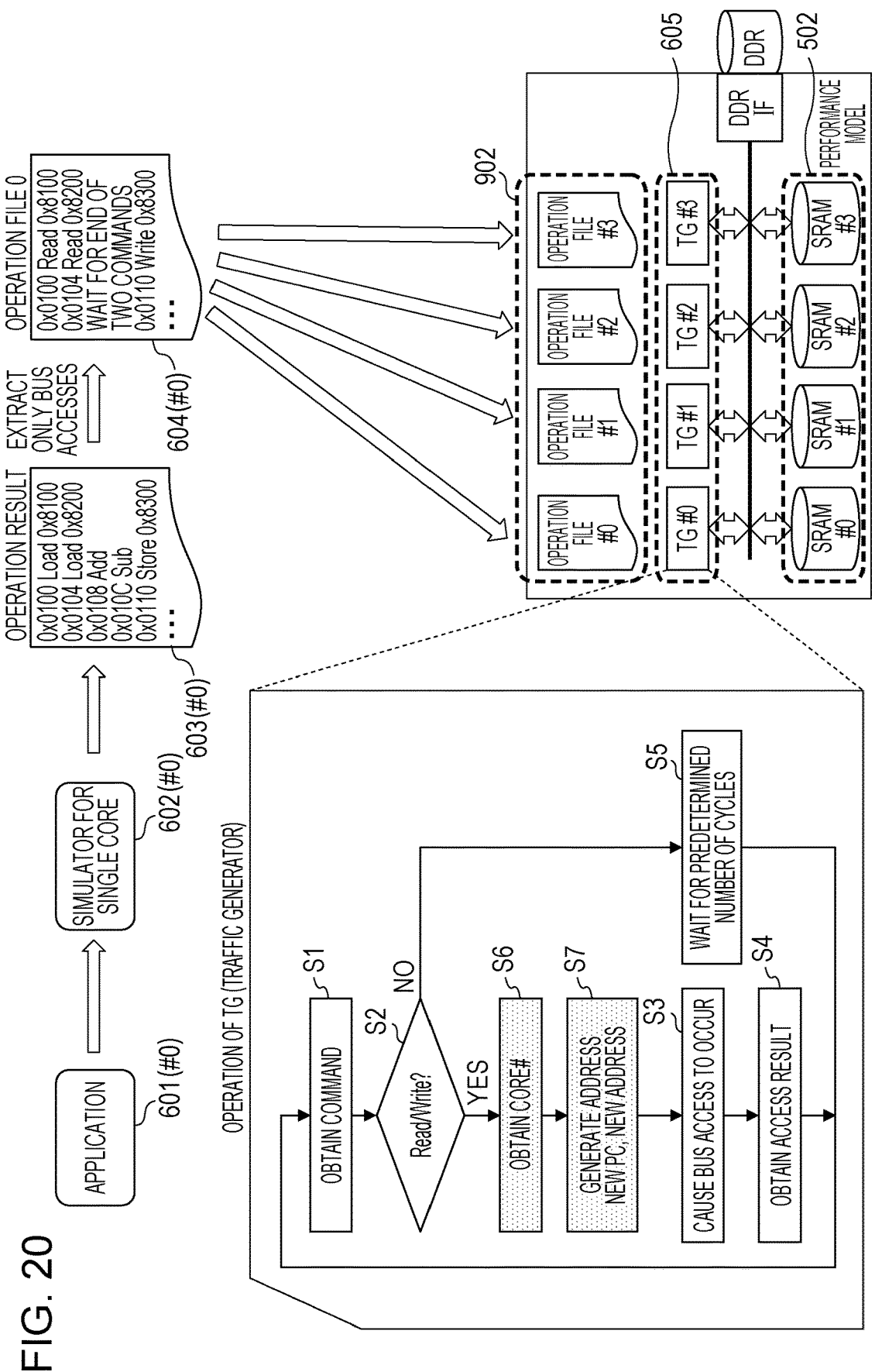
FIG. 20 is an explanatory diagram of a third embodiment.

FIG. 20 is an explanatory diagram of a third embodiment. In the first embodiment described in FIGS. 9 and 10, the address-converted copy generator 901 converts the address of each command in one operation file 604(#0) to generate the operation files 902(#1) to 902(#3). On the other hand, in the third embodiment, the operation files 902(#0) to 902(#3) same as the operation file 604(#0) are used. When the TGs 605 recognize the command of "read" or "write" in step S2 in FIG. 20, the TGs 605 obtain the number of the current core of the cores 501 (step S6). Next, the TGs 605 execute the address conversion similar to that in the first embodiment and the like corresponding to that number and generate a new program address and a new load-store address (step S7). The TGs 605 execute the bus access based on that generated addresses (step S3).

Figure 21:
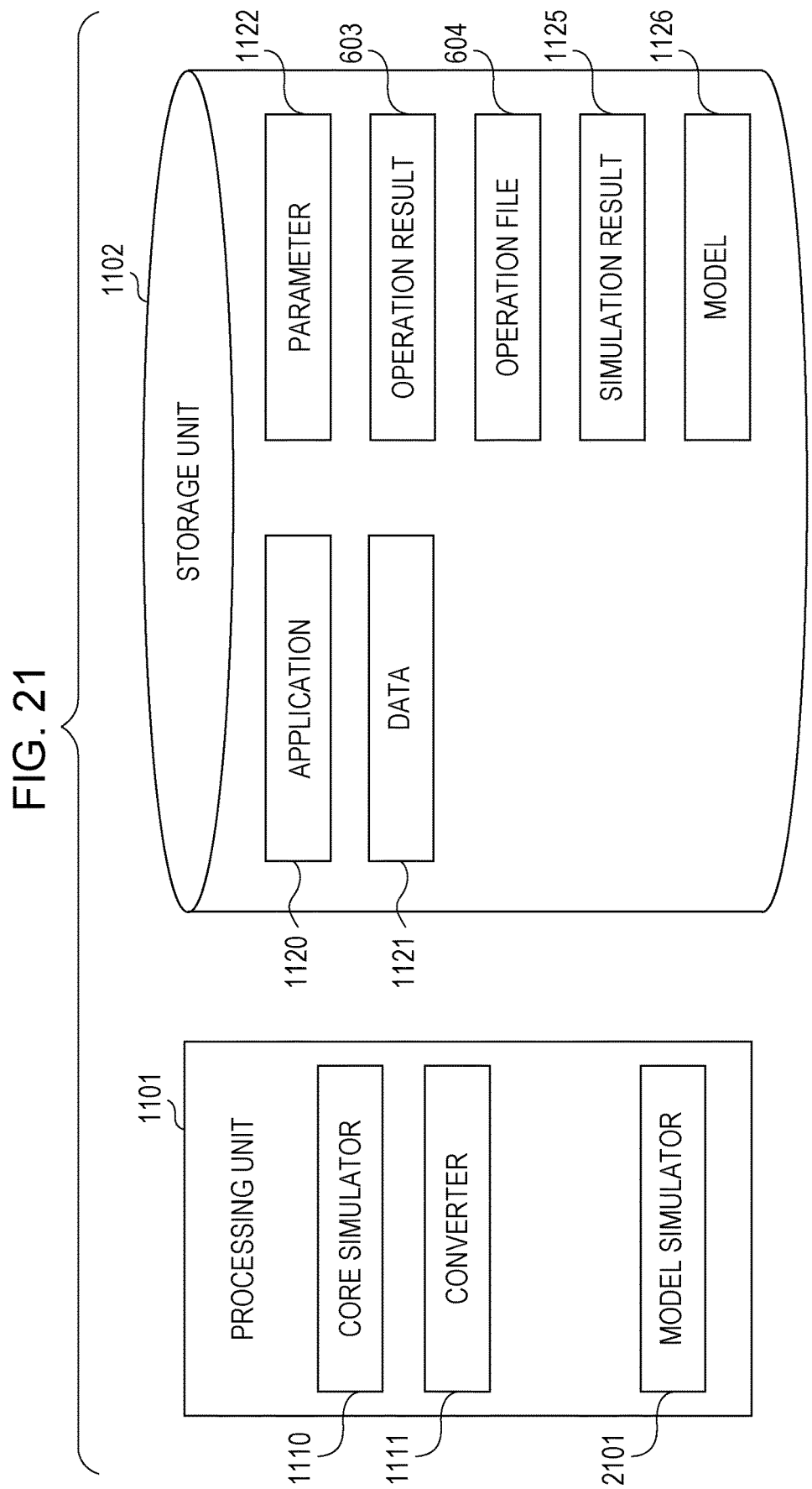
FIG. 21 is a block diagram that illustrates a configuration example of a simulation device of the third embodiment.

FIG. 21 is a block diagram that illustrates a configuration example of a simulation device of the third embodiment. Comparing with the configuration of the simulation device of the first embodiment described in FIG. 11, the address-converted copy generator 1112 in the first embodiment is omitted, and a model simulator 2101 as the TGs 605 includes the functionality of the address-converted copy generator 1112 in the first embodiment.

The above-described third embodiment makes it possible to implement the similar functionalities as those of the first embodiment and the like.

Figure 22:
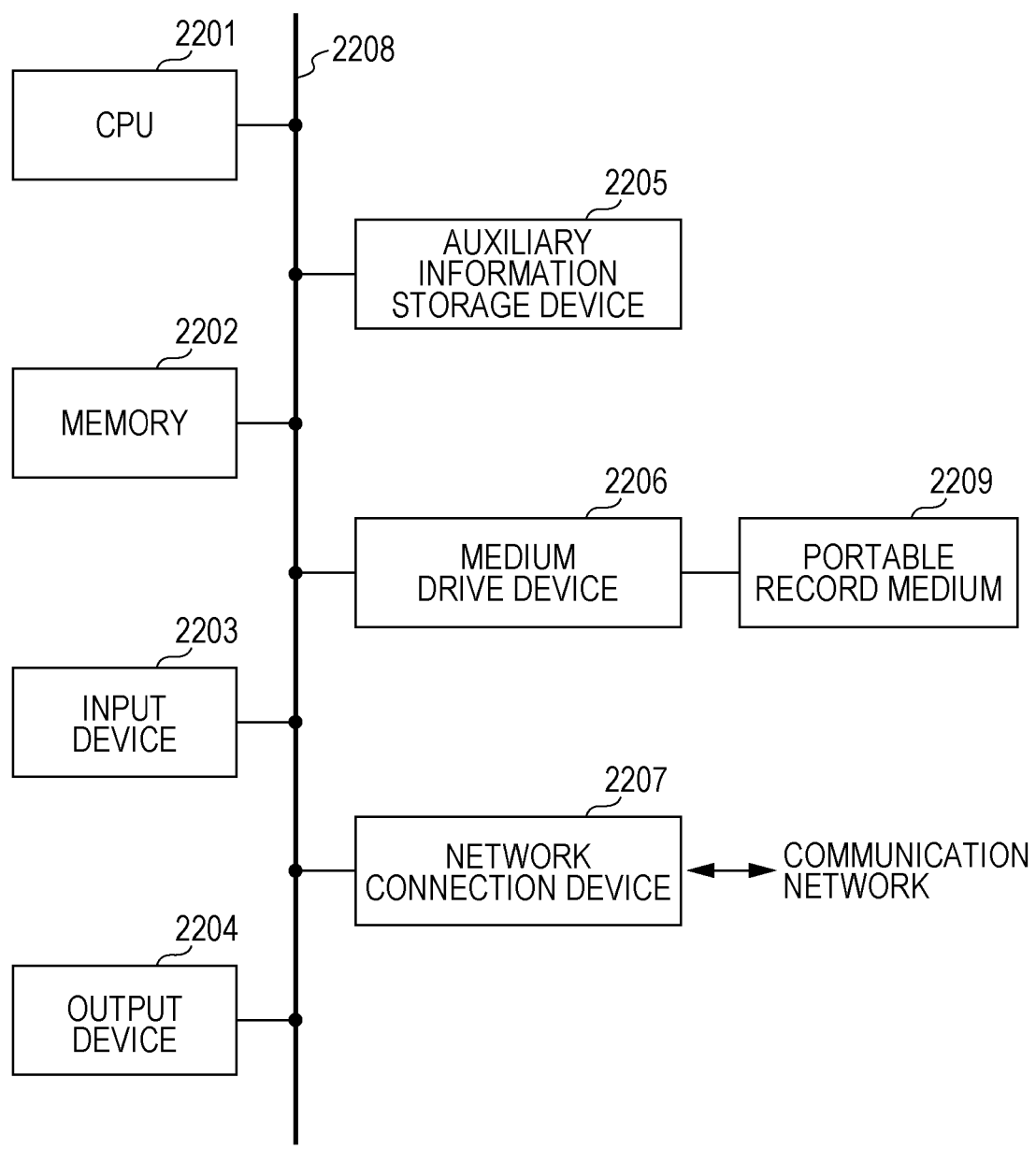
FIG. 22 is a diagram that illustrates an example of a hardware configuration of the simulation device (computer) corresponding to each embodiment.

FIG. 22 is a diagram that illustrates an example of a hardware configuration of the simulation device (computer) corresponding to the first to third embodiments.

The computer illustrated in FIG. 22 includes a central processing unit (CPU) 2201, a memory 2202, an input device 2203, an output device 2204, an auxiliary information storage device 2205, a medium drive device 2206 to which a portable record medium 2209 is inserted, and a network connection device 2207. These constituents are connected with each other via a bus 2208. The configuration illustrated in FIG. 22 is an example of a computer that implements the above-described simulation device, and such a computer is not limited to this particular configuration.

For example, the memory 2202 is a semiconductor memory such as a read only memory (ROM), a random access memory (RAM), and a flash memory that stores a program and data used for processing.

For example, the CPU (processor) 2201 executes the program using the memory 2202 to operate as the processing unit 1101 illustrated in FIGS. 11, 17, and 21.

For example, the input device 2203 is a keyboard, a pointing device, and the like used for inputting an instruction and information from an operator or a user. For example, the output device 2204 is a display device, a printer, a speaker, and the like used for outputting an inquiry and a processing result to the operator or the user.

For example, the auxiliary information storage device 2205 is a hard disk storage device, a magnetic disk storage device, an optical disk device, a magnetic optical disk device, a tape device, or a semiconductor storage device, and, for example, operates as the storage unit 1102 illustrated in FIGS. 11, 17, and 21. The simulation device of FIGS. 11, 17, and 21 is capable of storing the program and the data in the auxiliary information storage device 2205 and using them by loading into the memory 2202.

The medium drive device 2206 drives the portable record medium 2209 and accesses the recorded contents therein. The portable record medium 2209 is a memory device, a flexible disc, an optical disc, a magnetic optical disc, and the like. The portable record medium 2209 may be a compact disk read only memory (CD-ROM), a digital versatile disk (DVD), a universal serial bus (USB) memory, and the like. The operator or the user may store the program and the data in this portable record medium 2209 and may use them by loading into the memory 2202.

As described above, the computer-readable record medium that stores the program and the data used for the simulation processing of the simulation device of FIGS. 11, 17, and 21 is a physical (non-transitory) record medium such as the memory 2202, the auxiliary information storage device 2205, and the portable record medium 2209.

For example, the network connection device 2207 is a communication interface that is connected to a communication network such as the local area network (LAN) to perform data conversion for the communication. The simulation device of FIGS. 11, 17, and 21 may receive the program or the data from an external device via the network connection device 2207 and may use them by loading into the memory 2202.

The simulation device of FIGS. 11, 17, and 21 does not have to include all the constituents in FIG. 22, and a part of the constituents may be omitted depending on application or condition. For example, when no instruction and information have to be inputted from the operator or the user, the input device 2203 may be omitted. When the portable record medium 2209 or the communication network is not used, the medium drive device 2206 or the network connection device 2207 may be omitted.

Although the disclosed embodiments and their advantages are described in detail, those skilled in the art is able to perform various modification, addition, and omission without departing from the scope of the present disclosure clearly stated in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium that stores a simulation program, which simulates operations by a plurality of cores based on resource access operation descriptions on the plurality of cores, the simulation program causing a computer to execute:

extracting a resource access operation description on at least one core of the plurality of cores by executing the simulation program for at least one core; and under a condition where the at least one core and a second core among the plurality of cores have a specific relation in execution processing, generating a resource access operation description on the second core from the resource access operation description on the at least one core by including an address difference between an address of a resource to which the at least one core accesses and an address of a resource to which the second core accesses, wherein in the extracting the resource access operation description on the at least one core, two or more resource access operation descriptions on two or more cores among the plurality of cores are extracted by the executing simulation program for the two or more cores, in the generating the resource access operation description on the second core, the resource access operation description on the second core is generated based on any one of the resource access operation descriptions on the two or more cores, in the generating the resource access operation description on the second core, the address difference is calculated based on parameter information stored in a storage device, the parameter information including the number of resource access operation descriptions generated for the second core, an offset value of a program address, a program size value that indicates an upper limit of a program size of each of the plurality of cores, an offset value of a load-store address, and an upper limit value of a memory address used for each of the plurality of cores.

2. The storage medium according to claim 1, wherein the resource access operation description of the second core is a load command or a store command for a memory connected to a bus.

3. The storage medium according to claim 2, wherein each of the addresses of the resources to which the plurality of cores access is the program address or the load-store address of the load command or the store command.

4. The storage medium according to claim 1, wherein the specific relation in execution processing between the plurality of cores is a relation in which two or more cores among the plurality of cores execute a repeating process which includes a same sequence of commands, on a same or different of the program address or the load-store address.

5. A simulation method performed by a computer for simulating operations by a plurality of cores based on resource access operation descriptions on the plurality of cores, the method comprising:

extracting a resource access operation description on at least one core of the plurality of cores by executing a simulation program for at least one core; and under a condition where the at least one core and a second core among the plurality of cores have a specific relation in execution processing, generating a resource access operation description on the second core from the resource access operation description on the at least one core by including an address difference between an address of a resource to which the at least one core accesses and an address of a resource to which the second core accesses, wherein in the extracting the resource access operation description on the at least one core, two or more resource access operation descriptions on two or more cores among the plurality of cores are extracted by the executing simulation program for the two or more cores, in the generating the resource access operation description on the second core, the resource access operation description on the second core is generated based on any one of the resource access operation descriptions on the two or more cores, in the generating the resource access operation description on the second core, the address difference is calculated based on parameter information stored in a storage device, the parameter information including the number of resource access operation descriptions generated for the second core, an offset value of a program address, a program size value that indicates an upper limit of a program size of each of the plurality of cores, an offset value of a load-store address, and an upper limit value of a memory address used for each of the plurality of cores.

6. A simulation apparatus for simulating operations by a plurality of cores based on resource access operation descriptions on the plurality of cores, the apparatus comprising:

a memory, and a processor coupled to the memory and configured to perform a process including:

extracting a resource access operation description on at least one core of the plurality of cores by executing a simulation program for at least one core; and under a condition where the at least one core and a second core among the plurality of cores have a specific relation in execution processing, generating a resource access operation description on the second core from the resource access operation description on the at least one core by including an address difference between an address of a resource to which the at least one core accesses and an address of a resource to which the second core accesses, wherein in the extracting the resource access operation description on the at least one core, two or more resource access operation descriptions on two or more cores among the plurality of cores are extracted by the executing simulation program for the two or more cores, in the generating the resource access operation description on the second core, the resource access operation description on the second core is generated based on any one of the resource access operation descriptions on the two or more cores, in the generating the resource access operation description on the second core, the address difference is calculated based on parameter information stored in a storage device, the parameter information including the number of resource access operation descriptions generated for the second core, an offset value of a program address, a program size value that indicates an upper limit of a program size of each of the plurality of cores, an offset value of a load-store address, and an upper limit value of a memory address used for each of the plurality of cores.

7. A computer-implemented method for simulating performance of a Large Scale Integrated (LSI) circuit with a multi-core configuration, the method comprising:

receiving an application to be executed by a core simulator, the application resulting in at least one of a plurality of cores of the multi-core LSI accessing, via a bus, at least one of a plurality of memories;

simulating execution of the application to obtain an operation results for the plurality of cores;

extracting bus accesses from the operation results to generate operation files for the plurality of cores, the operation files including operation results involving the bus accesses and addresses within the plurality of memories;

converting, with an address-converted copy generator, the operation files into converted operation files in which an address of bus address performed by a core is converted;

simulating the performance of the LSI with a model simulator having a plurality of traffic generators corresponding to the plurality of cores, the model simulator executing the converted operation files; and outputting a simulation result based on simulation performed by the model simulator.

8. The method according to claim 7, wherein the converting converts the operation files into converted operation files to avoid resource contention between the plurality of cores.

9. The method according to claim 7, wherein the converting converts an address within the operation files into an address within the converted operation files based on parameter information stored in a storage device, the parameter information including the number of resource access operation descriptions generated for a respective core, an offset value of a program address, a program size value that indicates an upper limit of a program size of each of the plurality of cores, an offset value of a load-store address, and an upper limit value of a memory address used for each of the plurality of cores.

10. The method according to claim 7, wherein
the application executed by the core simulator includes a load command or a store command for accessing the at least one of the memories connected to the bus.

\* \* \* \* \*